US012083434B2

(12) United States Patent
Kanahara et al.

(10) Patent No.: US 12,083,434 B2
(45) Date of Patent: Sep. 10, 2024

(54) CONTROL METHOD FOR GAME APPARATUS, AND GAME SYSTEM WITH ADVERTISING MANAGEMENT

(71) Applicant: Konami Digital Entertainment Co., Ltd., Tokyo (JP)

(72) Inventors: Toshiaki Kanahara, Tokyo (JP); Shigeru Chiba, Tokyo (JP); Kai Inoue, Tokyo (JP); Junki Hirai, Tokyo (JP); Tsuguo Shinpo, Tokyo (JP); Akira Sakai, Tokyo (JP)

(73) Assignee: Konami Digital Entertainment Co., Ltd., Tokyo (JP)

(*) Notice: Subject to any disclaimer, the term of this patent is extended or adjusted under 35 U.S.C. 154(b) by 157 days.

(21) Appl. No.: 17/711,587

(22) Filed: Apr. 1, 2022

(65) Prior Publication Data

US 2022/0219084 A1 Jul. 14, 2022

Related U.S. Application Data

(63) Continuation of application No. PCT/JP2020/037097, filed on Sep. 30, 2020.

(30) Foreign Application Priority Data

Oct. 4, 2019 (JP) ................. 2019-183502

(51) Int. Cl.
*A63F 13/61* (2014.01)
*A63F 13/355* (2014.01)
(Continued)

(52) U.S. Cl.
CPC ............ *A63F 13/61* (2014.09); *A63F 13/355* (2014.09); *A63F 13/86* (2014.09); *A63F 13/87* (2014.09);
(Continued)

(58) Field of Classification Search
CPC ........ A63F 13/61; A63F 13/355; A63F 13/86; A63F 13/87; A63F 13/35; A63F 13/53;
(Continued)

(56) References Cited

U.S. PATENT DOCUMENTS

2004/0015608 A1* 1/2004 Ellis .................. A63F 13/12
709/246
2006/0294084 A1* 12/2006 Patel .................. G06Q 30/02
(Continued)

FOREIGN PATENT DOCUMENTS

JP 2001-236444 A 8/2001
JP 2001-321573 A 11/2001
(Continued)

OTHER PUBLICATIONS

Office Action issued Aug. 23, 2022 in Japanese Application No. 2019-183502.
(Continued)

*Primary Examiner* — David L Lewis
*Assistant Examiner* — Shauna-Kay Hall
(74) *Attorney, Agent, or Firm* — Sughrue Mion, PLLC

(57) ABSTRACT

A non-transitory computer-readable recording medium having instructions stored therein causes at least one processor of a game apparatus to: communicate with a distribution system configured to distribute videos to a plurality of terminal apparatuses; progress a computer game; generate, based on a progress of the computer game, video information that is used to play a video of the computer game indicating a state of a virtual space of the computer game; supply the video information to the distribution system; acquire spectator apparatus information from the distribution system, the spectator apparatus information relating to at least one spectator apparatus that is a part of the plurality of terminal apparatus, and receives a video based on the
(Continued)

video information from the distribution system; and control display of an advertisement in the virtual space, based on the spectator apparatus information.

15 Claims, 11 Drawing Sheets

(51) Int. Cl.
  *A63F 13/86*  (2014.01)
  *A63F 13/87*  (2014.01)
(52) U.S. Cl.
  CPC . *A63F 2300/5506* (2013.01); *A63F 2300/572* (2013.01)
(58) Field of Classification Search
  CPC ............ A63F 13/812; A63F 2300/5506; A63F 2300/572; A63F 2300/8011
  See application file for complete search history.

(56) References Cited

U.S. PATENT DOCUMENTS

| | | | |
|---|---|---|---|
| 2009/0025024 A1* | 1/2009 | Beser ..................... | H04H 60/45 725/35 |
| 2017/0003740 A1* | 1/2017 | Verfaillie ................ | A63F 13/87 |
| 2019/0099678 A1 | 4/2019 | Khan et al. | |
| 2022/0233960 A1* | 7/2022 | Chiba .............. | H04N 21/25891 |

FOREIGN PATENT DOCUMENTS

| | | |
|---|---|---|
| JP | 2002-253847 A | 9/2002 |
| JP | 2008-181334 A | 8/2008 |
| JP | 2009-510608 A | 3/2009 |
| JP | 2012-98598 A | 5/2012 |
| JP | 2013-178820 A | 9/2013 |
| JP | 2014-183956 A | 10/2014 |
| JP | 2016-189803 A | 11/2016 |
| JP | 2017-153737 A | 9/2017 |
| JP | 2017-167692 A | 9/2017 |
| JP | 2019-16179 A | 1/2019 |
| JP | 2019-40565 A | 3/2019 |
| WO | 2018/020764 A1 | 2/2018 |
| WO | 2019/067640 A1 | 4/2019 |

OTHER PUBLICATIONS

International Search Report dated Dec. 1, 2020 in International Application No. PCT/JP2020/037097.
Office Action dated Feb. 22, 2022 issued by the Japanese Patent Office in Japanese Application No. 2019-183502.
Written Opinion of the International Searching Authority dated Dec. 1, 2020 in International Application No. PCT/JP2020/037097.
Japanese Office Action issued Jan. 30, 2024 in Application No. 2019-183502.
International Search Report issued Dec. 1, 2020 in Japanese Application No. PCT/JP2020/037099.
Written Opinion of the International Searching Authority issued Dec. 1, 2020 in Japanese Application No. PCT/JP2020/037099.
Decision of Refusal issued Feb. 7, 2023 in Japanese Application No. 2019-190853.
Decision of Dismissal of Amendment issued Feb. 7, 2023 in Japanese Application No. 2019-190853.
Japanese Office Action issued Mar. 1, 2022 in Application No. 2019-190853.
Japanese Office Action issued Sep. 6, 2022 in Application No. 2019-190853.
United States Office Action issued Dec. 22, 2023 in U.S. Appl. No. 17/717,204.
Request for the Submission of an Opinion dated Apr. 9, 2024 in Korean Application No. 10-2022-7013357.
Request for the Submission of an Opinion dated Apr. 9, 2024 in Korean Application No. 10-2022-7013624.
Communication issued Jun. 18, 2024 in Japanese Application No. 2023-076702.
Office Action dated Jul. 5, 2024, issued in U.S. Appl. No. 17/717,204.

\* cited by examiner

FIG. 10

| ADD ID | ITEM NAME | IMAGE INFO | AUDIO INFO | DISPLAY POSITION INFO | AD POINTS |
|---|---|---|---|---|---|
| a001 | Fresh Taste Cider | 001.jpg | – | First Billboard | 30,000 |
| a002 | Fresh-baked Bread | 002.jpg | – | Second Billboard | 10,000 |
| a003 | Sugoroku Software | 003.jpg | – | Uniform | 80,000 |
| a004 | Okinawa Trip | – | 001.aac | Announcements | 15,000 |
| a005 | Comfortable Shoes | 004.jpg | – | Second Billboard | 20,000 |
| ... | ... | ... | ... | ... | ... |

TBL

CONTROL METHOD FOR GAME APPARATUS, AND GAME SYSTEM WITH ADVERTISING MANAGEMENT

CROSS REFERENCE TO RELATED APPLICATIONS

This application is a Continuation Application of PCT Application No. PCT/JP2020/037097, filed on Sep. 30, 2020, and is based on and claims priority from Japanese Patent Application No. 2019-183502 filed on Oct. 4, 2019, the entire contents of each of which are incorporated herein by reference.

BACKGROUND

Field of the Invention

The present disclosure relates to recording mediums, game apparatuses, control methods for game apparatuses and game systems.

Description of Related Art

In recent years, video distribution services are widely used. In the video distribution services, videos are generally shown on video display areas that are parts of a web screen for video distribution. In addition, advertisements, such as banner ads, are shown for video viewers on advertisement display areas that are parts of the web screen, but are separate from the video display areas. In the field of games, a method is known in which advertisements are shown, for computer game players, on objects in a virtual space (e.g., Japanese Patent Application Laid-Open Publication No. 2002-253847).

Computer game users, as well as spectators who watch a computer game video, are targeted for distribution of a computer game video. For this reason, even when advertisements are shown on objects in a virtual space, it is expected to control display of advertisements by looking at spectators. However, conventionally, advertisements are shown without consideration of the presence of spectators.

SUMMARY

The present disclosure has been made in view of the situations described above, and it has as an object to control display of an advertisement in a virtual space by looking at the presence of spectators of a computer game.

To achieve the stated object, a recording medium according to an aspect of the present enclosure is a non-transitory computer-readable recording medium having instructions stored therein that cause at least one processor of a game apparatus to: communicate with a distribution system configured to distribute videos to a plurality of terminal apparatuses; progress a computer game; generate, based on a progress of the computer game, video information that is used to play a video of the computer game indicating a state of a virtual space of the computer game; supply the video information to the distribution system; acquire spectator apparatus information from the distribution system, the spectator apparatus information relating to at least one spectator apparatus that is a part of the plurality of terminal apparatus, and receives a video based on the video information from the distribution system; and control display of an advertisement in the virtual space, based on the spectator apparatus information.

A game apparatus according to an aspect of the present disclosure includes: at least one memory storing instructions; and at least one processor that implements the instructions to: communicate with a distribution system configured to distribute videos to a plurality of terminal apparatuses; progress a computer game; generate, based on a progress of the computer game, video information that is used to play a video of the computer game indicating a state of a virtual space of the computer game; acquire spectator apparatus information from the distribution system, when the distribution system distributes a video based on the video information to at least one spectator apparatus that is a part of the plurality of the terminal apparatuses, the spectator apparatus information relating to the at least one spectator apparatus; and control display of an advertisement in the virtual space, based on the spectator apparatus information.

A computer-implemented control method according to an aspect of the present disclosure includes: communicating with a distribution system configured to distribute videos to a plurality of terminal apparatuses; progressing a computer game; generating, based on a progress of the computer game, video information that is used to play a video of the computer game indicating a state of a virtual space of the computer game; acquiring spectator apparatus information from the distribution system, when the distribution system distributes a video based on the video information to at least one spectator apparatus that is a part of the plurality of the terminal apparatuses, the spectator apparatus information relating to the at least one spectator apparatus; and controlling display of an advertisement in the virtual space, based on the spectator apparatus information.

A game system according to an aspect of the present disclosure includes: a distribution system configured to distribute videos to a plurality of terminal apparatuses; and a game apparatus that is configured to communicate with the distribution system, in which the game apparatus includes: at least one memory storing instructions; and at least one processor that implements the instructions to: progress a computer game; generate, based on a progress of the computer game, video information that is used to play a video of the computer game indicating a state of a virtual space of the computer game; acquire spectator apparatus information from the distribution system, when the distribution system distributes a video based on the video information to at least one spectator apparatus that is a part of the plurality of the terminal apparatuses, the spectator apparatus information relating to the at least one spectator apparatus; and control display of an advertisement in the virtual space, based on the spectator apparatus information.

BRIEF DESCRIPTION OF THE DRAWINGS

FIG. 10 is an example of a data structure of an advertisement management table.

DESCRIPTION OF THE EMBODIMENT

Hereinafter, modes for carrying out the present disclosure will be described with reference to the drawings. In each diagram, the dimensions and scale of each element are appropriately different from actual ones. The embodiment described below has preferable specific examples of the present disclosure. Accordingly, various technically preferable limitations are applied. However, the scope of the present disclosure is not limited to these modes unless there is a specific description limiting the present disclosure.

1. Embodiment

First, description will be given of an example outline of a game system 1 according to an embodiment with reference with FIG. 1.

Figure 1:
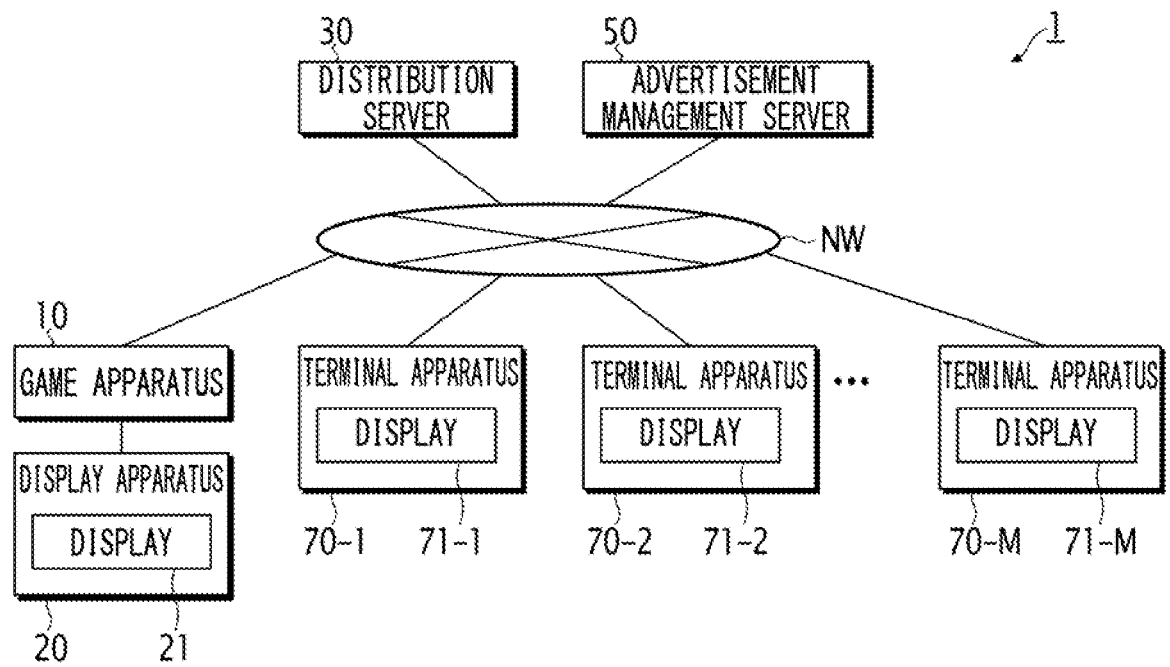
FIG. 1 is a diagram showing an overview of a game system according to an embodiment.

FIG. 1 is a diagram showing an overview of the game system 1 according to the embodiment.

The game system 1 shown in FIG. 1 includes a game apparatus 10 that is executable for a predetermined computer game, a display apparatuses 20 that corresponds to the game apparatus 10, a distribution server 30 (an example of a "distribution system"), an advertisement management server 50, and a plurality of M terminal apparatuses 70 (70-1 to 70-M). M is a natural number of 1 or more. In one example, the game apparatus 10, the distribution server 30, advertisement management server 50, and each of the terminal apparatuses 70 are connected communicably to one another via a network NW. In the following description, the m-th terminal apparatus 70 of the M terminals apparatuses 70-1 to 70-M is referred to as a terminal apparatus 70-*m*. The m is a natural number satisfying 1≤m≤M.

In one example, the game apparatus 10 displays, on a display 21 provided in the display apparatus 20 commutable with the game apparatus 10, a video of a predetermined computer game executed by the game apparatus 10. In this embodiment, an assumption will be made in which a computer baseball game (an example of a "computer game") is executed at the game apparatus 10.

In the following description, a video of the computer baseball game that is displayed on the display 21 by the game apparatus 10 is referred to as a "display-use video MVo" (see FIG. 2). In this embodiment, the display-use video MVo is an example of a "video of a computer game." In one example, the display-use video MVo may be a display-use still image, and it may be updated per unit period of time (e.g., 1/60 of a second). For each unit period of time, a display-use still image is displayed on the display 21.

In this embodiment, the game apparatus 10 supplies, to the distribution server 30, a video of the computer baseball game executed at the game apparatus 10. In the following description, the video of the computer baseball game that is supplied by the game apparatus 10 to the distribution server 30 is referred to as a "distribution-use video MVd" (see FIG. 3). In one example, the distribution-use video MVd may be a distribution-use still image, and it may be updated per unit period of time. For each unit period of time, a distribution-use still image is supplied by the game apparatus 10 to the distribution server 30.

In this embodiment, an assumption will be made in which a distribution-use video MVd is generated based on video information that is used to play a display-use video MVo, and the distribution-use video MVd and the display-use video MVo are identical to each other. However, the present disclosure is not limited to such an aspect. In one example, the distribution-use video MVd may have a lower resolution than the display-use video MVo.

In this embodiment, the distribution-use video MVd is an example of a "video based on the video information."

In one example, the game apparatus 10 supplies the distribution-use video MVd (the video information that is used to play a display-use video MVo) to the distribution server 30. Hereinafter, the video information that is used to play the display-use video MVo is referred to as "video information MVinf" (see FIG. 11).

In this embodiment, an assumption will be made that the game apparatus 10 is for home use. However, a freely selected information processing apparatus is used for the game apparatus 10. Examples of the game apparatus 10 include a commercial-use game device installed in a store or an amusement facility, a mobile device such as a cellar phone or a smart phone, and a stationary information device such as a personal computer. Examples of the display apparatus 20 include a liquid crystal display, a television receiver, and a touch panel display. The display apparatus 20 may be included in the game apparatus 10.

The distribution server 30 is an example of a distribution system that distributes a video, such as a distribution-use video MVd, to each of the terminal apparatuses 70. In one example, when receiving (i) a distribution-use video MVd from the game apparatus 10, and (ii) a distribution request of the distribution-use video MVd from a terminal apparatus 70-*m*, the distribution server 30 distributes, to the terminal apparatus 70-M, the distribution-use video MVd supplied form the game apparatus 10. Furthermore, when receiving, from the terminal apparatus 70-*m*, a distribution request of a video distribution screen DS that is used to display the distribution-use video MVd, the distribution server 30 distributes the video distribution screen DS to the terminal apparatus 70-*m* (see FIG. 3).

As will be described with reference to FIG. 11, the distribution server may send, to the game apparatus 10, information (an example of "spectator apparatus information") on the terminal apparatuses 70 playing the distribution-use videos MVd.

In an example shown in FIG. 1, the terminal apparatus 70-*m* includes a display 71-*m*. When the distribution-use video MVd is distributed from the distribution server 30, the terminal apparatus 70-*m* displays the distribution-use video MVd on a display 71-*m*. A freely selected information processing apparatus connectable with the Internet may be used for the terminal apparatus 70-*m*, examples of which include a smartphone, a cellar phone, and a personal computer.

In one example, the advertisement management server 50 supplies, to the game apparatus 10, information necessary for the game apparatus 10 to incorporate advertisements for products or services into the display-use video MVo.

The configuration of the game system 1 is not limited to the example shown in FIG. 1. In one example, in the game system 1 shown in FIG. 1, a distribution system, in which a video such as a distribution-use video MVd is distributed to the terminal apparatuses 70, is achieved by a single distribution server 30. However, the distribution system may be achieved by multiple distribution servers 30. In other words, the distribution system may include multiple distribution servers 30. There may be one or more distribution providers for distribution services to the distribution system. In one example, the distribution system may include (i) one or more distribution servers 30 that are managed by any provider from among multiple providers, and (ii) one or more distribution servers 30 that are managed by other providers.

The number of game apparatuses 10 included in the game system 1 is not limited to one. In one example, the game system 1 may include two or more game apparatuses 10. The advertisement management server 50 may supply, to the distribution server 30, information necessary for the distribution server 30 to distribute banner images. The banner images are still images or videos of advertisements for products or services.

Next, an overview will be given of the display-use video MVo generated by the game apparatus 10 with reference to FIG. 2.

Figure 2:
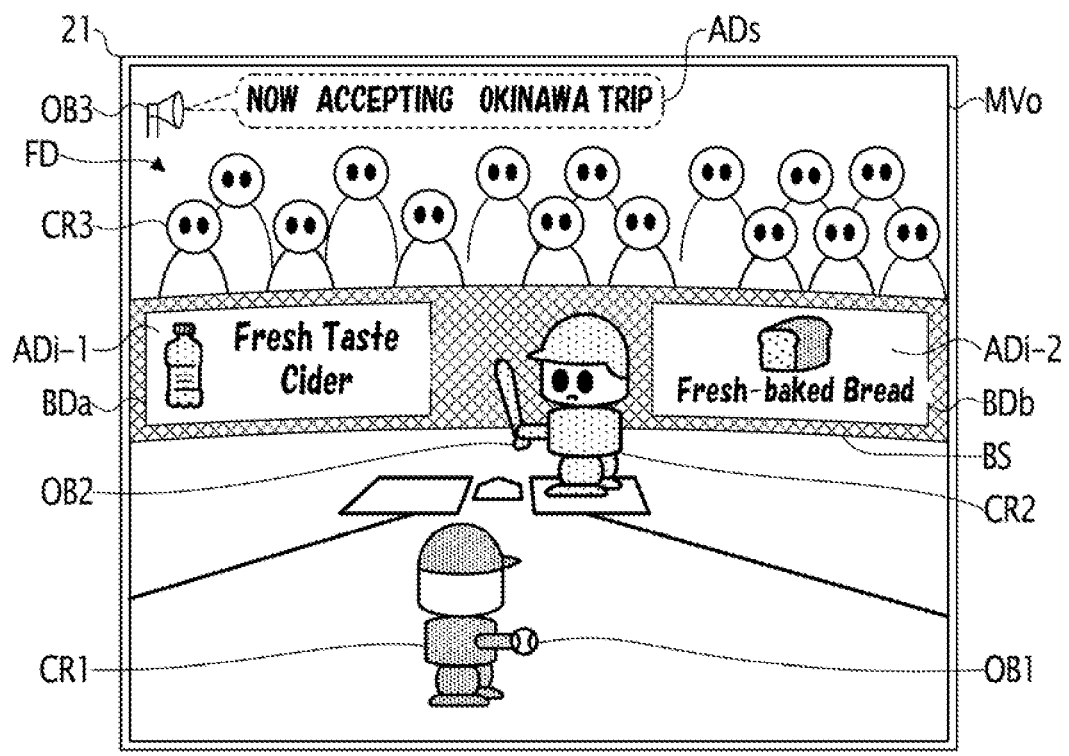
FIG. 2 is a diagram showing an example of an overview of a display-use video generated by a game apparatus shown in FIG. 1.

FIG. 2 is a diagram showing an example of an overview of a display-use video MVo generated by the game apparatus 10 shown in FIG. 1.

A display-use video MVo according to this embodiment shows how the computer baseball game is progressed in a virtual space FD, such as a virtual baseball ground. In an example shown in FIG. 2, the display-use video MVo shows that, in the virtual space FD, a pitcher character CR1 is throwing a ball object OB1, and a batter character CR2 is hitting the ball object OB1 thrown by the pitcher character CR1 with a baseball bat object OB2. In an example of the display-use video MVo, spectator characters CR3 watch the baseball game in the virtual space FD.

The progress of the computer baseball game in the virtual space FD is an example of a "state of a virtual space of a computer game."

The state of the virtual space FD may be some or all of states relating to a game element in the virtual space FD, or it may be some or all of states relating to sound in the virtual space FD. Alternatively, the state of the virtual space FD may be some or all of states including: (i) a state relating to a game element in the virtual space FD; and (ii) a state relating to sound in the virtual space FD.

A game element in the virtual space FD may be disposed at any position in the virtual space FD. Here, the game element may be controlled by a program (a processor that executes the program) of the game apparatus 10. Furthermore, the game element may be a character, an object, and an environmental component in the virtual space FD. The environmental component in the virtual space FD may be an element of a virtual baseball ground in the virtual space FD. Examples of the element of the virtual baseball ground include a baseball ground, and a back net thereof.

A state relating to a game element may be a position of a game element in the virtual space FD, or it may be the shape, pattern, or color of the game element. Alternatively, the state relating to the game element may be a direction or a movement speed of the game element in the virtual space FD. Alternatively, the "situation relating to the game element" may be some or all of the position, shape, pattern, color, direction of movement, and speed of movement of the game element in the virtual space FD.

Sound in the virtual space FD may be output or heard at any position in the virtual space FD, or it may be associated with a game element in the virtual space FD, or it may be both of these. The sound may include audio (voice).

In some cases, the display-use video MVo according to this embodiment includes one or more video advertisements AD (an example of an "advertisement"). In this embodiment, video advertisements AD may be still images or moving images relating to target advertisements, such as products or services, which are shown on game elements in the virtual space FD. Alternatively, the video advertisements AD may be audios relating thereto, which are output from game elements in the virtual space FD.

In the following description, if a video advertisement AD is a still image or a moving image displayed on a game element in the virtual space FD, it is referred to as an "image advertisement ADi."

In FIG. 2, in order to distinguish an image advertisement ADi from others, a hyphen and a suffix number (e.g., 1 or 2) are added at the end of the reference sign thereof. Hereinafter, if a video advertisement AD is an audio in the virtual space FD, it is referred to as an "audio advertisement ADs."

In FIG. 2, an example will be given in which (i) an image advertisement ADi–1 is a still image displayed on a billboard BDa on a fence BS in a virtual baseball ground, and (ii) an image advertisement ADi–2 is a still image displayed on a billboard BDb on the fence BS therein.

Furthermore, in FIG. 2, an example will be given in which an audio advertisement ADs is an audio output from a speaker object OB3 in the virtual baseball ground.

The position at which an image advertisement ADi is shown is not limited to the billboards BD (including BDa and BDb). In one example, the image advertisement ADi may be displayed on the uniforms of player characters, such as a pitcher character CR1 and a batter character CR2.

In this embodiment, for example, duration of display of an image advertisement ADi displayed on the billboard BD (BDa or BDb) is determined based on the number of the terminal apparatuses 70 playing distribution-use videos MVd. The method of determining the duration of display of an image advertisement ADi will be described later in FIG. 10.

Next, description will be given of an overview of a video distribution screen DS supplied by the distribution server 30 to a terminal apparatus 70-*m* with reference to FIG. 3.

Figure 3:
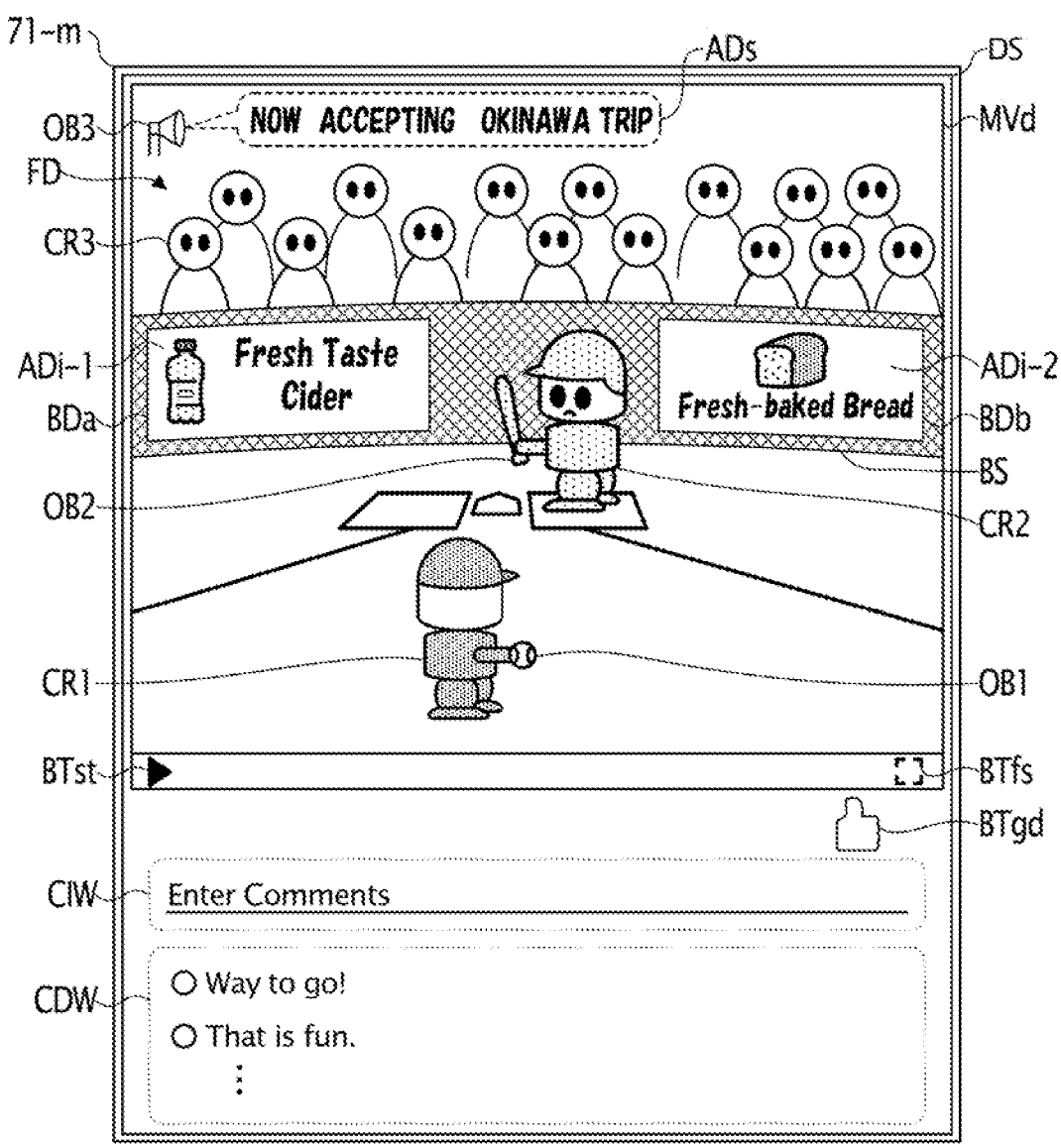
FIG. 3 is a diagram showing an example overview of a video distribution screen supplied by the distribution server to the terminal apparatus.

FIG. 3 is a diagram showing an example overview of a video distribution screen DS supplied by the distribution server 30 to a terminal apparatus 70-*m*.

In one example, on the video distribution screen DS shown is a distribution-use video MVd supplied from the distribution server 30.

Furthermore, as shown in FIG. 3, on the video distribution screen DS shown are, for example, a play button BTst, a full screen button BTfs, a like button BTgd, a comment entering area CTW, and a comment display area CDW. In one example, during stopping of a play of the distribution-use video MVd displayed on the video distribution screen DS, when the play button BTst is clicked, the distribution-use video MVd is resumed. In one example, when the full screen button BTfs is clicked while the distribution-use video MVd is displayed on the video distribution screen DS, the display area of the distribution-use video MVd is expanded to cover the entire display area 71-*m*.

In one example, when the like button BTgd is clicked while the distribution-use video MVd is displayed on the video distribution screen DS, information indicative of a click of the like button BTgd is sent from the terminal apparatus 70-m to the distribution server 30.

The like button BTgd is used to express user's positive feelings (e.g., like, enjoyable, and agree) toward the distribution-use video MVd. This user is intended to be the user of the terminal apparatus 70-m who watches the distribution-use video MVd.

In one example, the user of the terminal apparatus 70-m enters, into the terminal apparatus 70-m, a comment on the distribution-use video MVd. In the comment entering area CIW shown is the comment that has been entered to the terminal apparatus 70-m, but it is not yet posted. In the comment display area CDW shown are comments on the distribution-use video MVd. In the comment display area CDW, shown are comments posted by users other than the user of the terminal apparatus 70-m who watches the distribution-use video MVd. The comments on the distribution-use video MVd may be displayed on the display 21 of the display apparatus corresponding to the game apparatus 10. In one example, the game apparatus 10 may control the display 21 such that comments on the distribution-use video MVd are displayed in an area different from the area for showing the display-use video MVo.

The video distribution screen DS is not limited to the example shown in FIG. 3. In one example, some or all of the play button BTst, the full screen button BTfs, the like button BTgd, the comment entering area CIW and the comment display area CDW may not be displayed on the video distribution screen DS. In one example, banner images of advertisements of products or services may be displayed on the video distribution screen DS.

Next, description will be given of functions of the game apparatus 10, the distribution server 30, and the advertisement management server 50 with reference to FIGS. 4 to 9. First, the configuration of the game apparatus 10 will be described with reference to FIGS. 4 and 5.

Figure 4:
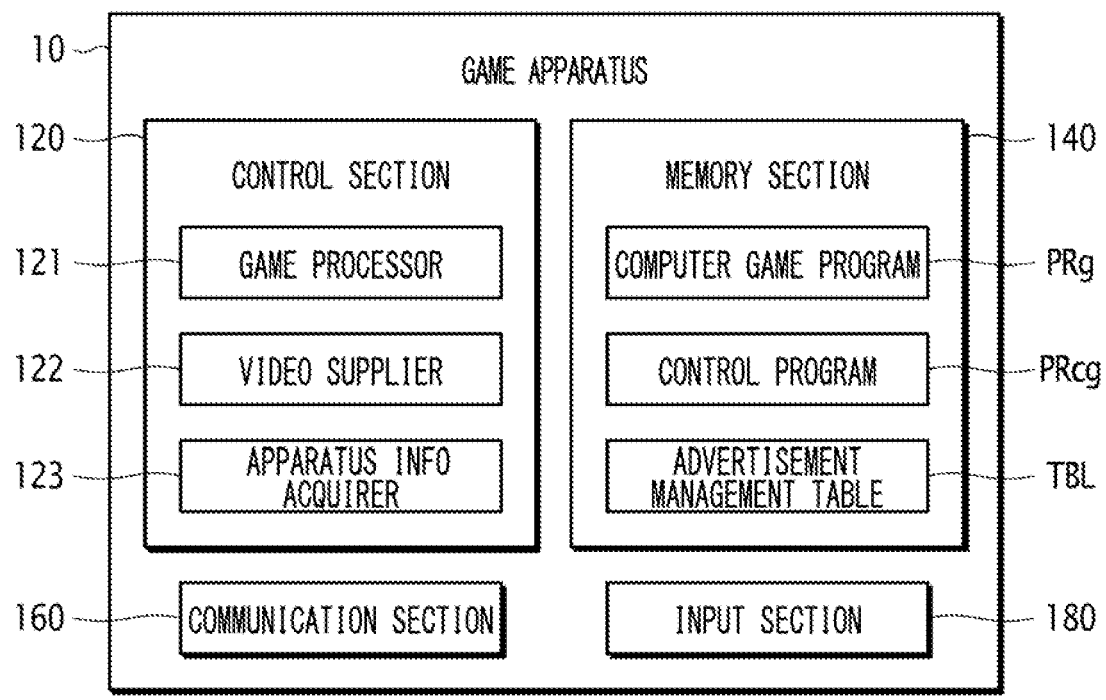
FIG. 4 is a functional block diagram of an example of the game apparatus shown in FIG. 1.

FIG. 4 is a functional block diagram of an example of the game apparatus 10 shown in FIG. 1.

The game apparatus 10 includes: a control section 120; a memory section 140 that stores therein a computer game program PRg (an example of a "program"), a control program PRcg, and such various information; a communication section 160 that communicates with external apparatuses including the distribution server 30 and the advertisement management server 50; and an input section 180 that receives input made by the user of the game apparatus 10. The computer game program PRg is, for example, an application program for the computer baseball game executed by the game apparatus 10. The control program PRcg is, for example, an application program for controlling each part of the game apparatus 10 by the control section 120. An advertisement management table TBL includes information necessary for the game apparatus 10 to incorporate advertisements of products or services into the display-use video MVo. The data structure of the advertisement management table TBL will be described later with reference to FIG. 10.

The control section 120 controls each part of the game apparatus 10. Furthermore, the control section 120 controls progress of the computer baseball game executed at the game apparatus 10. In one example, the control section 120 includes a game processor 121 (an example of a "computer game controller"), a video supplier 122 (an example of a "supplier"), and an apparatus information acquirer 123 (an example of an "acquirer").

In one example, the game processor 121 progresses the computer baseball game based on inputs made by the user of the game apparatus 10. The game processor 121 generates, based on a progress result of the computer baseball game, video information MVinf that is used to play a display-use video MVo. The display-use video MVo indicates a state of the virtual space FD. In one example, the game processor 121 generates progress state information indicative of the state of the progressed computer game. Then, the game processor 121 generates, based on the generated progress state information, video information MVinf that is used to play a display-use video MVo. The display 21 displays the display-use video MVo, based on the video information MVinf generated by the game processor 121.

In one example, the progress state information is used to manage states of various game elements in the virtual space FD and sound in the virtual space FD, based on the state of the virtual space FD changing as the computer baseball game progress. Specifically, in this embodiment, the progress state information includes some or all of the following: position, shape, posture, orientation, color, pattern, speed of movement, and direction of movement of each of the game elements in the virtual space FD, sound in the virtual space FD.

The video information MVinf may indicate a display-use still image that is updated per unit period of time (a display-use still image that is updated per unit period of time in real time). Alternatively, it may indicate a set of display-use still images that correspond one-to-one to unit periods of time (a set of display-use still images that have been accumulated over unit periods of time). Alternatively, the video information MVinf may be obtained by adding information indicative of sound in the virtual space FD to (i) a display-use still image that is updated per unit period of time, or (ii) a set of display-use still images that are updated per unit period of time. The display-use still image may represent the virtual space FD in each unit period of time, and a state of each of the various game elements in each unit period of time.

When distributing a distribution-use video MVd, the video supplier 122 supplies video information MVinf to the distribution server 30 via the communication section 160. As a result, a distribution-use video MVd based on the video information MVinf is distributed to the terminal apparatus 70-m and others.

The apparatus information acquirer 123 acquires, from the distribution server 30, information on one or more terminal apparatuses 70 playing the distribution-use videos MVd.

The terminal apparatuses 70 playing the distribution-use videos MVd are parts of the M terminal apparatuses 70-1 to 70-M, and are spectator apparatuses. Each of the spectator apparatuses receives, from the distribution server 30, the distribution-use video MVd based on the video information MVinf. Hereinafter, information on the spectator apparatuses that receive the distribution-use video MVd from the distribution server 30 is referred to as "spectator apparatus information WTinf" (see FIG. 11).

In one example, the spectator apparatus information WTinf may be apparatus information of a terminal apparatus 70 playing the distribution-use video MVd. Alternatively, it may be response information based on user inputs made to the terminal apparatuses 70 playing the distribution-use videos MVd. Alternatively, the spectator apparatus information WTinf may be information including both apparatus information and response information.

In one example, the apparatus information may indicate the number of terminal apparatuses 70 playing distribution-use videos MVd, or it may indicate types of terminal apparatuses 70. Alternatively, the terminal information may indicate both the number of terminal apparatuses 70 playing the distribution-use videos MVd and types thereof.

In one example, the response information may be rating information on a rating of a distribution-use video MVd that is given by a user (a spectator), or it may be comment information on comments posted by the user on the distribution-use video MVd. Alternatively, the response information may be information using both the rating information and the comment information. In one example, the rating information may indicate the number of users who gave a favorable rating to the distribution-use video MVd. Specifically, the rating information may indicate the number of users who have clicked the like button BTgd shown in FIG. 3, or it may indicate the number of times the like button BTgd has been clicked. In one example, the comment information may indicate the number of comments posted on the distribution-use video MVd.

In this embodiment, an assumption will be made in which the spectator apparatus information WTinf indicates the number of terminal apparatuses 70 playing distribution-use videos MVd (hereinafter, "the number of spectator apparatuses"). In one example, the game processor 121 controls display of advertisements in the virtual space FD, based on the number of terminal apparatuses 70 playing the distribution-use videos MVd. The controlling of display of advertisements in the virtual space FD will be described in detail later in FIG. 10.

The display of an advertisement in the virtual space FD may mean that there is a video advertisement AD in the virtual space FD (that is, there are one or both of an image advertisement ADi and an audio advertisement ADs relating to the targeted advertisement). In this case, the video advertisement AD in the virtual space FD may be displayed on one or both of the displays 21 and 71, or it may not be.

The display of an advertisement in the virtual space FD may mean that the same video advertisement AD in the virtual space FD is displayed on one or both of the displays 21 and 71. In one example, the display of an advertisement in the virtual space FD may mean that a video advertisement AD in the virtual space FD is displayed on the display 21 by playing a display-use video MVo or a distribution-use video MVd. In this embodiment, an assumption will be made in which there is no limitation on whether video advertisements AD in the virtual space FD are displayed on either the display 21 or 71.

The controlling of display of an advertisement may mean that a duration during which a video advertisement AD is displayed in the virtual space FD is controlled (hereinafter, a "display duration"), or it may mean the number of times the video advertisement AD is displayed in the virtual space FD is controlled (hereinafter, a "display frequency"), or it may mean that both the display duration and the display frequency are controlled.

The configuration of the game apparatus 10 is not limited to the example shown in FIG. 4. In one example, if the display apparatus 20 shown in FIG. 1 is included in the game apparatus 10, the game apparatus 10 may include a display 21 that displays various images, such as a display-use video MVo.

Next, the hardware configuration of the game apparatus 10 will be described with reference to FIG. 5.

Figure 5:
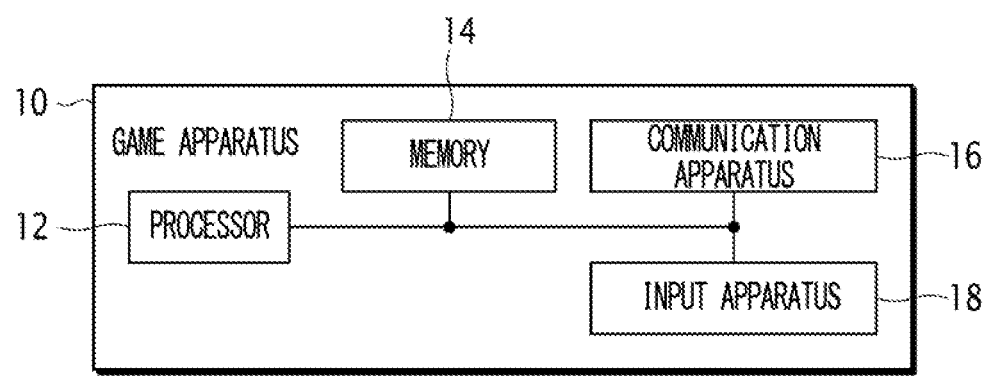
FIG. 5 is an example of hardware configuration of the game apparatus shown in FIG. 4.

FIG. 5 is an example of hardware configuration of the game apparatus shown in FIG. 4.

The game apparatus 10 includes a processor 12 (an example of a "processor of the game apparatus") that controls each part of the game apparatus 10, a memory 14 that stores various information, a communication apparatus 16, and an input apparatus 18.

The memory 14 is, for example, a computer-readable recording medium. The memory 14 is anon-transitory storage medium, and functions as the memory section 140. The memory 14 includes one or both of (i) volatile memory, such as Random Access Memory (RAM) as a work area of the processor 12, and (ii) a non-volatile memory, such as an Electrically Erasable Programmable Read-Only Memory (EEPROM) that stores various information, such as the computer game program PRg and the control program PRcg.

The memory 14 may be detachable from the game apparatus 10, specific examples of which include a storage medium, such as a memory card detachable therefrom. The memory 14 may be a memory apparatus (e.g., an online storage) communicatively connected to the game apparatus 10 via the network NW or the like. In other words, the "recording medium" having the computer game program PRg recorded therein may be a storage included in an external apparatus external to the game apparatus 10, or it may be a storage that has the computer game program PRg recorded therein and that is included in a distribution server. The distribution server is external to the game apparatus 10 and distributes the computer game program PRg.

In one example, the processor 12 includes one or more Central Processing Units (CPUs). In one example, the processor 12 executes the control program PRcg stored in the memory 14 and is operated in accordance with the control program PRcg, to function as the control section 120 that controls each part of the game apparatus 10. Furthermore, the processor 12 executes the computer game program PRg stored in the memory 14 and is operated in accordance with the computer game program PRg, to function as the control section 120 that executes the computer baseball game. In one example, the processor 12 that is operated in accordance with the computer game program PRg stored in the memory 14 functions as the control section 120 including the game processor 121, the video supplier 122 and the apparatus information acquirer 123.

In one example of the processor 12 including CPUs, some or all of the functions of the control section 120 may be achieved by operation in cooperation with these CPUs in accordance with a program, such as the control program PRcg and the computer game program PRg. In addition to the one or more CPUs, or in place of some or all of the CPUs, the processor 12 may include a Graphics Processing Unit (GPU), a Digital Signal Processor (DSP), a Field Programmable Gate Array (FPGA), or other hardware. Some or all of the control section 120 achieved by the processor 12 may be achieved by hardware, such as a DSP.

The communication apparatus 16 is hardware to communicate with external apparatuses external to the game apparatus 10 via one or both of the wired network and the wireless network, and functions as the communication section 160.

The input apparatus 18 is hardware to receive user inputs made to the game apparatus 10, and functions as the input section 180. In one example, the input apparatus 18 may comprise one or more devices, including some or all of input buttons, a touch panel, a keyboard, a joystick, and a pointing device, such as a mouse.

Next, a configuration of the distribution server 30 will be described with reference to FIGS. 6 and 7.

Figure 6:
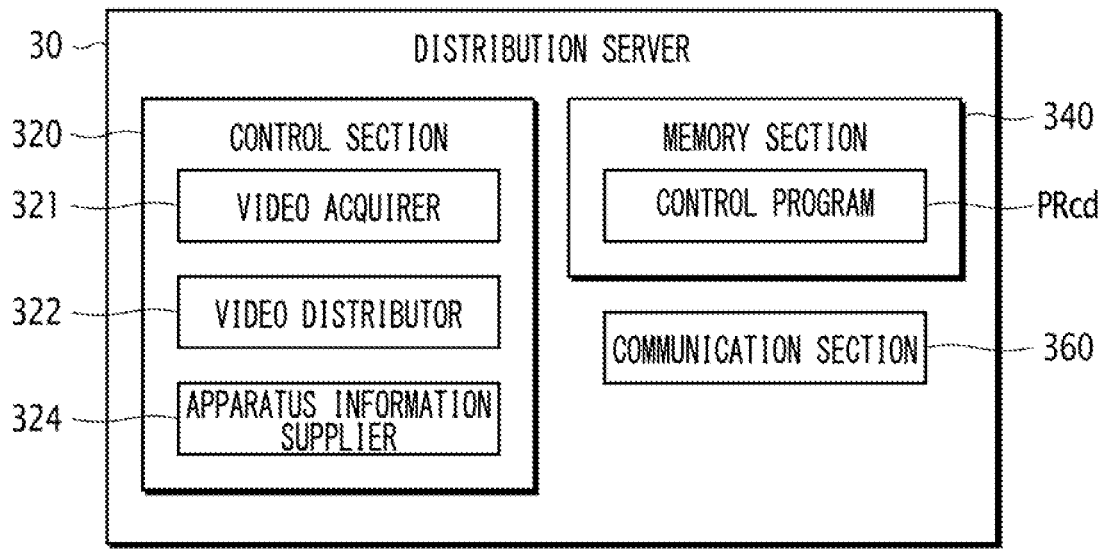
FIG. 6 is a functional block diagram showing an example of the configuration of a distribution server shown in FIG. 1.

FIG. 6 is a functional block diagram showing an example of the configuration of the distribution server 30 shown in FIG. 1.

The distribution server 30 includes a control section 320 that controls each part of the distribution server 30, a memory section 340 that stores various information, and a communication section 360 that communicates with external apparatuses including the game apparatus 10 and a terminal apparatus 70-*m*. The control section 320 includes a video acquirer 321 that acquires video information MVinf from the game apparatus 10 via the communication section 360, a video distributor 322, and an apparatus information supplier 324 that supplies spectator apparatus information WTinf to the game apparatus 10 via the communication section 360.

In one example, the video distributor 322 sends, to the terminal apparatus 70-*m*, information that is used to display a video distribution screen DS on the terminal apparatus 70-*m* via the communication section 360, to distribute the video distribution screen DS to the terminal apparatus 70-*m*. Hereinafter, information that is used to show the video distribution screen DS on a terminal apparatus 70 is referred to as "distribution screen information DSinf" (see FIG. 11). In one example, the distribution screen information DSinf may be generated by the video distributor 322, or it may be generated by another functional block different from the video distributor 322. Furthermore, in one example, the video distributor 322 sends the video information MVinf to the terminal apparatus 70-*m* via the communication section 360, to distribute a distribution-use video MVd based on the video information MVinf to the terminal apparatus 70-*m*. The memory section 340 stores a control program PRcd for controlling each part of the distribution server 30.

Next, a hardware configuration of the distribution server 30 will be described with reference to FIG. 7.

Figure 7:
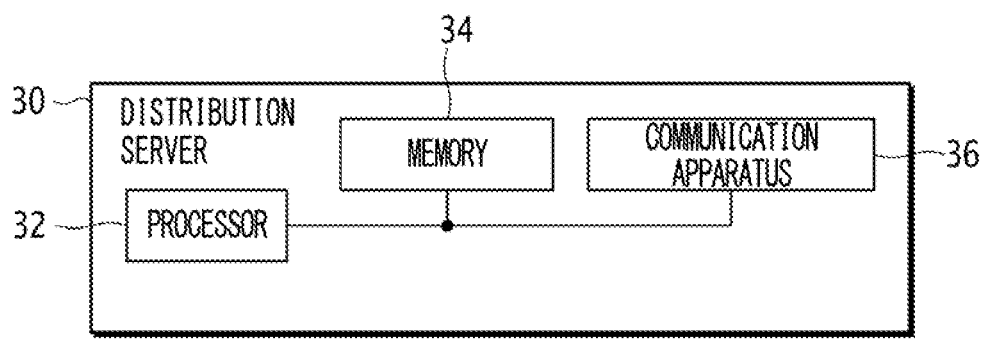
FIG. 7 is an example of a hardware configuration of the distribution server shown in FIG. 6.

FIG. 7 is an example of the hardware configuration of the distribution server 30 shown in FIG. 6.

The distribution server 30 includes a processor 32 that controls each part of the distribution server 30, a memory 34 that stores various information, and a communication apparatus 36 that communicates with external apparatuses external to the distribution server 30.

In one example, the memory 34 functions as a memory section 340, and includes one or both of: (i) a volatile memory, such as a RAM, that acts as a work area of the processor 32; and (ii) a non-volatile memory, such as an EEPROM, for storing various information, such as the control program PRcd. In one example, the processor 32 includes one or more CPUs. The processor 32 executes the control program PRcd stored in the memory 34 and is operated in accordance with the control program PRcd, to function as the control section 320. The communication apparatus 36 is hardware to communicate with external apparatuses external to the distribution server 30, and functions as the communication section 360.

The configuration of the distribution server 30 is not limited to the examples shown in FIGS. 6 and 7. In one example, the distribution server 30 may include an input apparatus that functions as an input section that receives inputs by the administrator and others for the distribution server 30.

Next, a configuration of the advertisement management server 50 will be described with reference to FIGS. 8 and 9.

Figure 8:
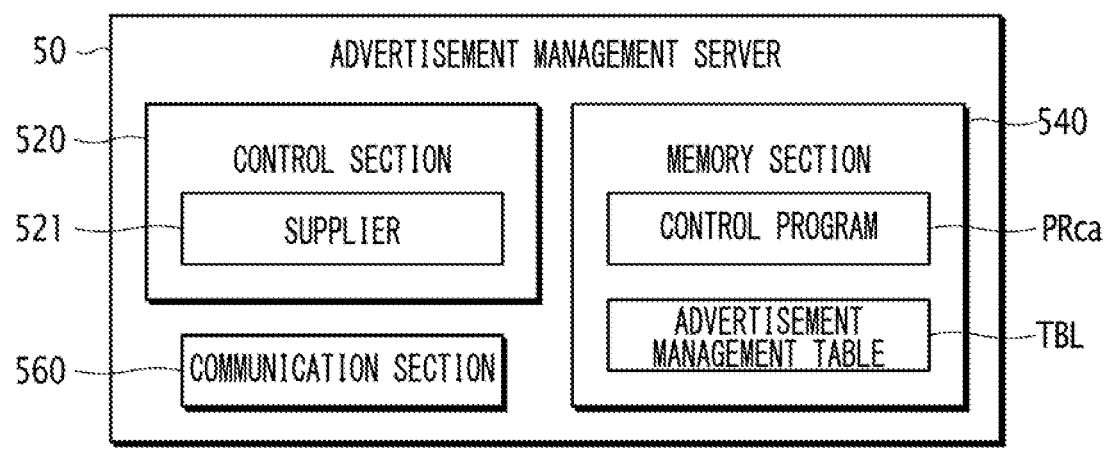
FIG. 8 is a functional block diagram showing an example of a configuration of an advertisement management server shown in FIG. 1.

FIG. 8 is a functional block diagram showing an example of the configuration of the advertisement management server 50 shown in FIG. 1.

The advertisement management server 50 includes a control section 520 that controls each part of the advertisement management server 50, a memory section 540 that stores various information, and a communication section 560 that communicates with external apparatuses including the game apparatus 10. The control section 520 includes a supplier 521. The memory section 540 stores a control program PRca that is used to control each part of the advertisement management server 50, and various information, such as an advertisement management table TBL. In one example, the advertisement management table TBL stored in the memory section 540 is supplied to the game apparatus 10.

Figure 11:
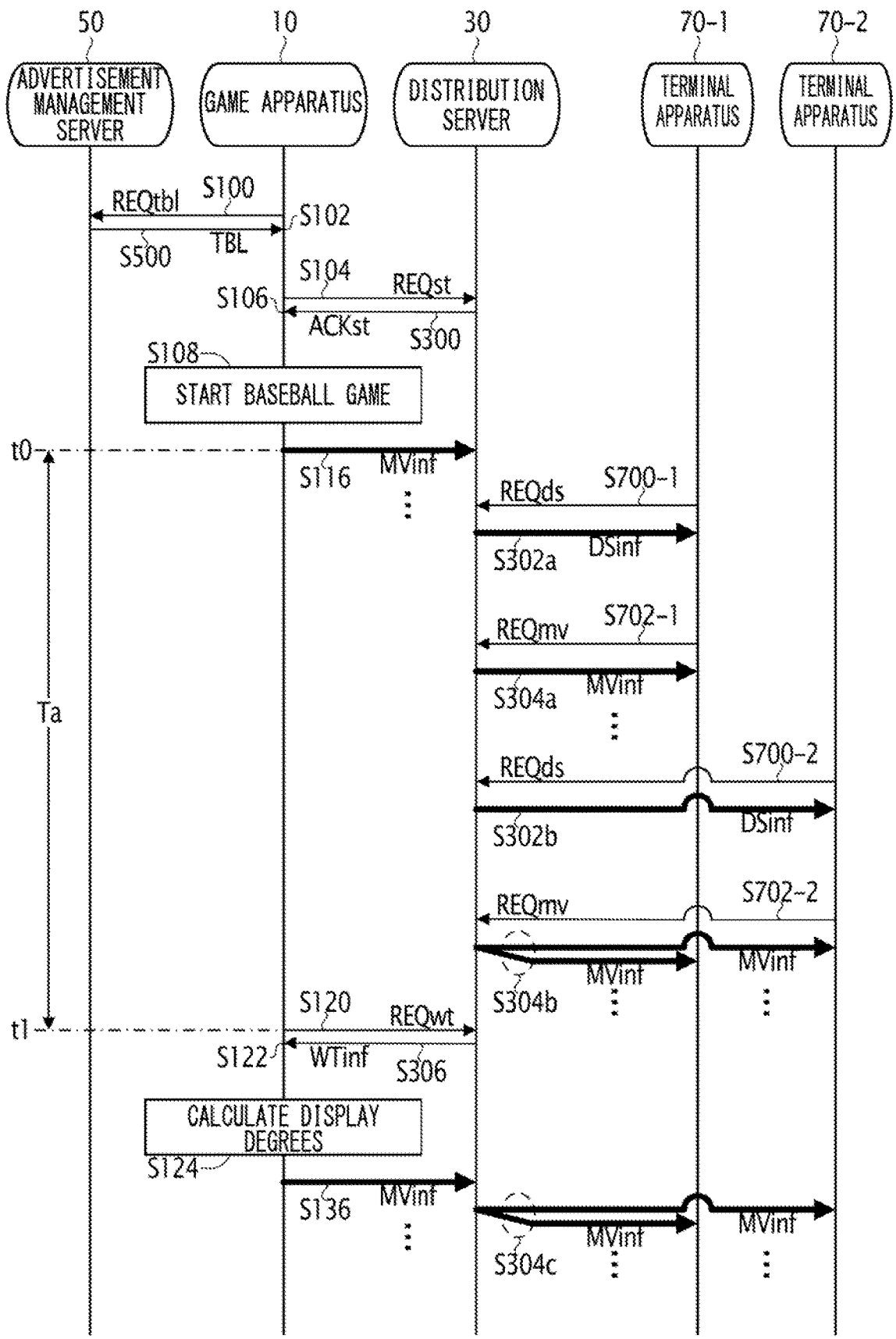
FIG. 11 is a sequence chart of example procedures for the game system shown in FIG. 1.

In one example, when receiving a table acquisition request REQtbl shown in FIG. 11 from the game apparatus 10 via the communication section 560, the supplier 521 sends the advertisement management table TBL stored in the memory section 540 to the game apparatus 10 via the communication section 560. The table acquisition request REQtbl will be described later. Before the start of the computer baseball game, the advertisement management table TBL stored in the memory section 140 of the game apparatus 10 shown in FIG. 3 is identical to one sent by the supplier 521 to the game apparatus 10. After the end of the computer baseball game, in one example, the advertisement management table TBL stored in the memory section 540 is updated based on the content of the advertisement management table TBL sent from the game apparatus 10. Alternatively, the advertisement management table TBL stored in the memory section 540 is updated based on the content of the advertisement management table TBL sent from the game apparatus 10 in response to the end of the computer baseball game.

Next, a hardware configuration of the advertisement management server 50 will be described with reference to FIG. 9.

Figure 9:
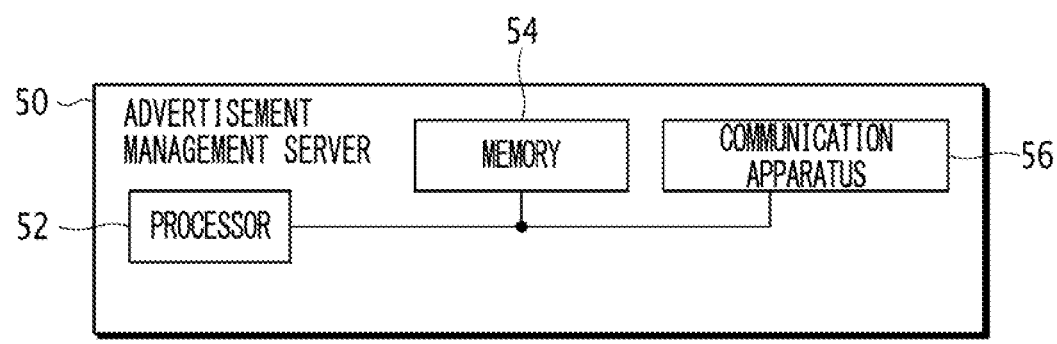
FIG. 9 is an example of a hardware configuration of the advertisement management server shown in FIG. 8.

FIG. 9 is an example of the hardware configuration of the advertisement management server 50 shown in FIG. 8.

The advertisement management server 50 includes a processor 52 that controls each part of the advertisement management server 50, a memory 54 that stores various information, and a communication apparatus 56 that communicates with external apparatuses external to the advertisement management server 50.

In one example, the memory 54 functions as the memory section 540, and includes one or both of: (i) a volatile memory, such as a RAM, that acts as a work area of the processor 52; and (ii) a non-volatile memory, such as an EEPROM, for storing various information, such as the control program PRca and the advertisement management table TBL. In one example, the processor 52 includes one or more CPUs. The processor 52 executes the control program PRca stored in the memory 54, and is operated in accordance with the control program PRca, to function as the control section 520. The communication apparatus 56 is hardware to communicate with external apparatuses external to the advertisement management server 50, and functions as the communication section 560.

The configuration of the advertisement management server 50 is not limited to the examples shown in FIGS. 8 and 9. In one example, the advertisement management server 50 may include an input apparatus that functions as an input section that receives inputs by the administrator and others for the advertisement management server 50.

Next, the advertisement management table TBL stored in the memory section 540 of the advertisement management server 50 will be described with reference to FIG. 10.

FIG. 10 is an example of a data structure of the advertisement management table TBL. In one example, the advertisement management table TBL has records associated one-to-one with video advertisements AD to be displayed in the virtual space FD.

Each record in the advertisement management table TBL includes an advertisement ID, a commodity name, image information, audio information, display position information, and advertisement points. The advertisement ID is used to identify one from among the video advertisements AD. The commodity name indicates, for example, a product or a service for a video advertisement AD associated with the advertisement ID.

The image information indicates a still image file or a video file that is used to show the video advertisement AD associated with the advertisement ID. If the video advertisement AD is an audio advertisement ADs, image information may indicate invalidity, such as a null, or it may indicate that the video advertisement AD is an audio advertisement ADs.

The audio information indicates an audio file that is used to play the video advertisement AD associated with the advertisement ID. If the video advertisement AD is an image advertisement ADi, audio information may indicate invalidity, such as a null, or it may indicate that the video advertisement AD is an audio advertisement ADs.

The display position information indicates a position in the virtual space FD at which the video advertisement AD associated with the advertisement ID is displayed. If the video advertisement AD associated with the advertisement ID is an image advertisement ADi, examples of a position in the virtual space FD at which the video advertisement AD is displayed include positions of billboards, and uniforms of the player characters. In one example, a "first billboard" shown in FIG. 10 corresponds to the billboard BDa shown in FIG. 2, and a "second billboard" corresponds to the billboard BDb shown in FIG. 2.

If the video advertisement AD associated with the advertisement ID is an audio advertisement ADs, examples of a position in the virtual space FD at which the video advertisement AD is displayed include announcements. In one example, the announcements shown in FIG. 10 mean that content of an audio advertisement ADs is output as an audio from the speaker object OB3 shown in FIG. 2. In FIG. 2, to clarify description, an example has been described in which the speaker object OB3 is displayed on the screen for a display-use video MVo. However, even if the speaker object OB3 is not displayed on the screen of the display-use video MVo, an audio corresponding to the audio advertisement ADs may be output.

The advertisement points represent numerical values that are used to calculate display duration of the video advertisement AD associated with the advertisement ID. In one example, the advertisement points correspond to advertising fees for displaying the video advertisement AD associated with the advertisement ID in the virtual space FD. In one example, display duration of a video advertisement AD (e.g., unit is "seconds") is defined by "advertisement points/number of spectator apparatuses." As described in FIG. 4, the number of spectator apparatuses refers to the number of the terminal apparatuses 70 playing the distribution-use video MVd, and it is obtained from spectator apparatus information WTinf.

In one example, if the number of spectator apparatuses indicated by the spectator apparatus information WTinf is 100, the game processor 121 determines that a display duration of a video advertisement AD with the advertisement ID "a001" is 300 seconds (=30,000/100). A display duration of a video advertisement AD with an advertisement ID "a002" is determined to be 100 seconds (=10,000/100). A display duration of a video advertisement AD with an advertisement ID "a003" is determined to be 800 seconds (=80,000/100). A display duration of a video advertisement AD with an advertisement ID "a004" is determined to be 150 seconds (=15,000/100). A display duration of a video advertisement AD with an advertisement ID "a005" is determined to be 200 seconds (=20,000/100).

Upon determining a display duration of each of the video advertisements AD, the game processor 121 displays the video advertisements AD in the virtual space FD sequentially in accordance with the determined display durations.

Specifically, the game processor 121 displays an image advertisement ADi-1 indicative of "Fresh Taste Cider" on the billboard BDa shown in FIG. 2 for 300 seconds, and it displays an image advertisement ADi-2 indicative of "Fresh-baked Bread" on the billboard BDb for 100 seconds. Furthermore, the game processor 121 displays an image advertisement ADi indicative of "Sugoroku Software" on each uniform of the player character for 800 seconds, and it plays an audio advertisement ADs indicative of "Okinawa Trip" from the speaker object OB3 for 150 seconds. After displaying the image advertisement ADi-2 indicative of "Fresh-baked Bread" on the billboard BDb for 100 seconds, the game processor 121 displays an image advertisement ADi indicative of "Comfortable Shoes" on the billboard BDb for 200 seconds.

Thus, the game processor 121 controls display of each of the video advertisements AD in the virtual space FD, based on (i) the spectator apparatus information WTinf acquired by the apparatus information acquirer 123 and (ii) the advertisement points of each video advertisement AD.

The order in which the video advertisements AD are displayed in the virtual space FD may be determined in advance, or it may be randomly selected. Alternatively, the order may be determined based on information on spectators of the computer baseball game (e.g., the order in which the advertisement effects are expected).

A display duration may be separated by a predetermined unit of time. In one example, if the unit of time is 15 seconds, an image advertisement ADi-1 indicative of "Fresh Taste Cider" may be shown 20 times on the billboard BDa (=300 seconds/15 seconds), and an image advertisement ADi-2 indicative of "Fresh-baked Bread" may be shown 6 times on the billboard BDb (=90 seconds/15<100 seconds/15).

The image advertisement ADi-1 indicative of "Fresh Taste Cider" may be shown 20 times in series on the billboard BDa, or it may be shown 20 times at intervals on the billboard BDa. Similarly, the image advertisement ADi-2 indicative of "Fresh-baked Bread" may be shown 6 times in series on the billboard BDb, or it may be shown 6 times at intervals on the billboard BDb.

The advertisement points of each video advertisement AD will be used in accordance with how much they are displayed in the current computer baseball game. Display points corresponding to some that are not displayed in the current computer baseball game will be carried over to the next.

In one example, if the total time of displaying the image advertisement ADi-2 indicative of "Fresh-baked Bread" on the billboard BDb is 90 seconds (=15 seconds×6 times), advertisement points for 90 seconds ("9,000"=90 seconds× 100 times) is used. The remaining ("1,000"=10,000-9,000) is carried over to the next computer baseball game.

If each display frequency is managed in terms of unit of time, the unit of time may be the same for an image advertisement ADi and an audio advertisement ADs, or it may not be. In one example, an image advertisement ADi may be managed in terms of 15 seconds, and an audio advertisement ADS may be managed in terms of 5 seconds. Alternatively, both the image advertisement ADi and audio advertisement ADS may be managed in terms of 5-second units. The unit of time is not limited to the foregoing examples of numerical values.

The data structure of the advertisement management table TBL is not limited to the example shown in FIG. 10. In one example, the advertisement points may be numerical values that are used to calculate a display frequency of a video advertisement AD associated with an advertisement ID. In this case, a display frequency of a video advertisement AD in the virtual space FD may be defined by "advertisement points/number of spectator apparatuses." Alternatively, a display frequency of a video advertisement AD in the virtual space FD for a predetermined unit time may be counted as one count.

Next, description will be given of an overview of procedures for the game system 1 with reference to FIG. 11.

FIG. 11 is a sequence chart of example procedures for the game system 1 shown in FIG. 1. In FIG. 11, the terminal apparatuses 70-1 and 70-2 are shown from among the M terminal apparatuses 70 to clarify the drawing. However, the terminal apparatuses 70 playing distribution-use videos MVd are not limited to the terminal apparatuses 70-1 and 70-2. Hereinafter, an example of the procedures for the game system 1 shown in FIG. 11 is referred to as "system procedure example."

First, the control section 120 of the game apparatus 10 controls each part of the game apparatus 10 to send, to the advertisement management server 50, a table acquisition request REQtbl that is used to acquire the advertisement management table TBL (S100).

When the advertisement management server 50 receives the table acquisition request REQtbl, the control section 520 thereof controls each part of the advertisement management server 50 to send the advertisement management table TBL to the game apparatus 10 that has sent the table acquisition request REQtbl (S500). The control section 120 of the game apparatus 10 receives the advertisement management table TBL from the advertisement management server 50 via the communication section 160 (S102). The advertisement management table TBL is a response to the table acquisition request REQtbl.

As long as the game apparatus 10 acquires the advertisement management table TBL before the start of step S124 (calculating a display degree of an advertisement), the table acquisition request REQtbl may be sent to the advertisement management server 50 after the start of the computer baseball game. Description of step S124 will be given later.

The control section 120 of the game apparatus 10 controls each part of the game apparatus 10 to send a distribution start request REQst to the distribution server 30 (S104). The distribution start request REQst indicates that the game apparatus 10 will start to supply a distribution-use video MVd to the distribution server 30.

When the distribution server 30 receives the distribution start request REQst, the control section 320 thereof controls each part of the distribution server 30 to send a permission response ACKst to the game apparatus 10 (S300). The permission response ACKst is a response to the distribution start request REQst. Thereafter, the control section 120 of the game apparatus 10 acquires, via the communication section 160, the permission response ACKst that is sent from the distribution server 30 and is a response to the distribution start request REQst (S106).

Thereafter, the control section 120 of the game apparatus 10 starts the computer baseball game (S108). The control section 120 of the game apparatus 10 may start the computer baseball game before sending the distribution start request REQst to the distribution server 30. After the start of the computer baseball game, the control section 120 of the game apparatus controls each part of the game apparatus 10 to send the video information MVinf to the distribution server 30 (S116). As a result, the distribution server 30 receives a supply of the distribution-use video MVd based on the video information MVinf.

In the system procedure example, the distribution period starts at the timing of step S116. In other words, in the system procedure example, the timing of step S116 corresponds to a distribution start time t0. In the example shown in FIG. 11, during the distribution period, an assumption will be made in which each of the terminal apparatuses 70-1 and 70-2 sends a video distribution screen request REQds to the distribution server 30 (S700).

In one example, the terminal apparatus 70-1 sends a video distribution screen request REQds to the distribution server 30 (S700-1). When the distribution server 30 receives the video distribution screen request REQds, the control section 320 thereof controls each part of the distribution server 30 to send distribution screen information DSinf to the terminal apparatus 70-1 (S302a). As described in FIG. 6, the distribution screen information DSinf is used to display a video distribution screen DS on the terminal apparatus 70.

Thereafter, when the video distribution screen DS is displayed in the display 71-1 of the terminal apparatus 70, when the play button BTst is clicked, the terminal apparatus 70-1 sends a video distribution request REQmv to the distribution server 30 (S702-1). In one example, the video distribution request REQmv indicates a request for distributing a distribution-use video MVd.

In the system procedure example, an example will be assumed in which step S702-1 is executed at a timing after time t0, but before time t1. In the system procedure example, time t1 indicates a time at which the game apparatus 10 sends an apparatus information acquisition request REQwt to the distribution server 30. This request REQwt will be described later.

When the distribution server 30 receives the video distribution request REQmv, the control section 320 thereof controls each part of the distribution server 30 to send the video information MVinf to the terminal apparatus 70-1 (S304a). Although details are not shown in FIG. 11, the terminal apparatus 70-1 plays the distribution-use video MVd, based on the video information MVinf received from the distribution server 30.

In one example, the terminal apparatus 70-2 sends a video distribution screen request REQds to the distribution server 30 (S700-2). When the distribution server 30 receives the video distribution screen request REQds, the control section 320 thereof controls each part of the distribution server 30 to send a distribution screen information DSinf to the terminal apparatus 70-2 (S302b).

Thereafter, during the video distribution screen DS is displayed on the display 71-2 of the terminal apparatus 70-2, when the play button BTst is clicked, the terminal apparatus 70-2 sends a video distribution request REQmv to the distribution server 30 (S702-2).

When the distribution server 30 receives the video distribution request REQmv, the control section 320 thereof controls each part of the distribution server 30 to send video information MVinf to the terminal apparatuses 70-1 and 70-2 (S304b). Before receiving the video distribution request REQmv from the terminal apparatus 70-2, the distribution server 30 has started distributing the distribution-use video MVd to the terminal apparatus 70-1. For this reason, at step S304b, the video information MVinf is sent to both the terminal apparatuses 70-1 and 70-2.

At time t1 after a predetermined time Ta has elapsed from the distribution start time t0, the control section 120 of the game apparatus 10 controls each part of the game apparatus 10 to send, to the distribution server 30, an apparatus information acquisition request REQwt that is used to acquire spectator apparatus information WTinf (S120). When the distribution server 30 receives the apparatus information acquisition request REQwt, the control section 320 thereof controls the distribution server 30 to send the spectator apparatus information WTinf to the game apparatus 10 (S306). The control section 120 of the game apparatus 10 acquires the spectator apparatus information WTinf via the communication section 160. The spectator apparatus information WTinf relates to the terminal apparatus 70 receiving the distribution-use video MVd from the distribution server 30 (S122).

The control section 120 of the game apparatus 10 calculates a display degree of each of the advertisements, based on (i) the spectator apparatus information WTinf acquired from the distribution server 30 at step S122, and (ii) the advertisement management table TBL acquired from the advertisement management server 50 at step S102 (S124).

The display degree of the advertisement may be defined by a duration during which a video advertisement AD is displayed in the virtual space FD, or it may be defined as the number of times the video advertisement AD is displayed in the virtual space FD. Alternatively, the display degree of the advertisement may be a concept including both (i) a duration during which a video advertisement AD is displayed in the virtual space FD, and (ii) the number of times the video advertisement AD is displayed in the virtual space FD.

After step S124 (calculating a display degree of an advertisement), video advertisements AD are incorporated into the virtual space FD such that a display degree of each of the video advertisements AD in the virtual space FD is identical to a corresponding display degree calculated at step S124. In one example, the control section 120 of the game apparatus 10 incorporates video advertisements AD into the virtual space FD, based on (i) the advertisement management table TBL, and (ii) a display degree of each of the advertisements calculated at step S124. Thereafter, the control section 120 of the game apparatus 10 generates video information MVinf that is used to play a display-use video MVo. The display-use video MVo shows the state of the virtual space FD in which the video advertisements AD are incorporated. The generated video information MVinf is sent from the game apparatus 10 to the distribution server 30 (S136).

In other words, the control section 120 of the game apparatus 10 calculates a display degree of each of the advertisements, and then controls each part of the game apparatus 10 to send the video information MVinf to the distribution server 30 (S136). As a result, the distribution-use video MVd based on the video information MVinf is supplied to the distribution server 30.

The control section 320 of the distribution server 30 controls each part of the distribution server 30 to send the video information MVinf to the terminal apparatuses 70-1 and 70-2 (S304c). Each of the terminal apparatuses 70 plays a distribution-use video MVd, based on the video information MVinf received from the game apparatus 10 via the distribution server 30. For this reason, video advertisements AD are incorporated into the virtual space FD shown by the distribution-use video MVd (i.e., the virtual space FD played by each of the terminal apparatuses 70).

As described above, in the system procedure example, a display degree of each of the advertisements is calculated after time t1. In other words, a display degree of each of the advertisements is not calculated before time t1 (i.e., a period of time from the distribution start time t0 until the predetermined time Ta elapses). Accordingly, before a display degree of each of the advertisements is calculated (e.g., before time t1), video advertisements AD may not be displayed in the virtual space FD.

The procedures for the game system 1 are not limited to the example shown in FIG. 11. In one example, step S120 (sending an apparatus information acquisition request REQwt to the distribution server 30) may be omitted. If step S120 is omitted, the distribution server 30 may repeatedly send spectator apparatus information WTinf to the game apparatus 10 at intervals. In this case, the control section 120 of the game apparatus 10 may calculate a display degree of each of the advertisements, based on the spectator apparatus information WTinf which is first received by the game apparatus 10 from the distribution server 30 after time t1. Alternatively, the control section 120 of the game apparatus 10 may calculate a display degree of each of the advertisements based on the spectator apparatus information WTinf which is last received by the game apparatus 10 from the distribution server 30 before time t1.

If step S120 is omitted, the distribution server 30 may send the spectator apparatus information WTinf to the game apparatus 10 at time t1, which is after the predetermined time Ta has elapsed from the distribution start time t0.

Figure 12:
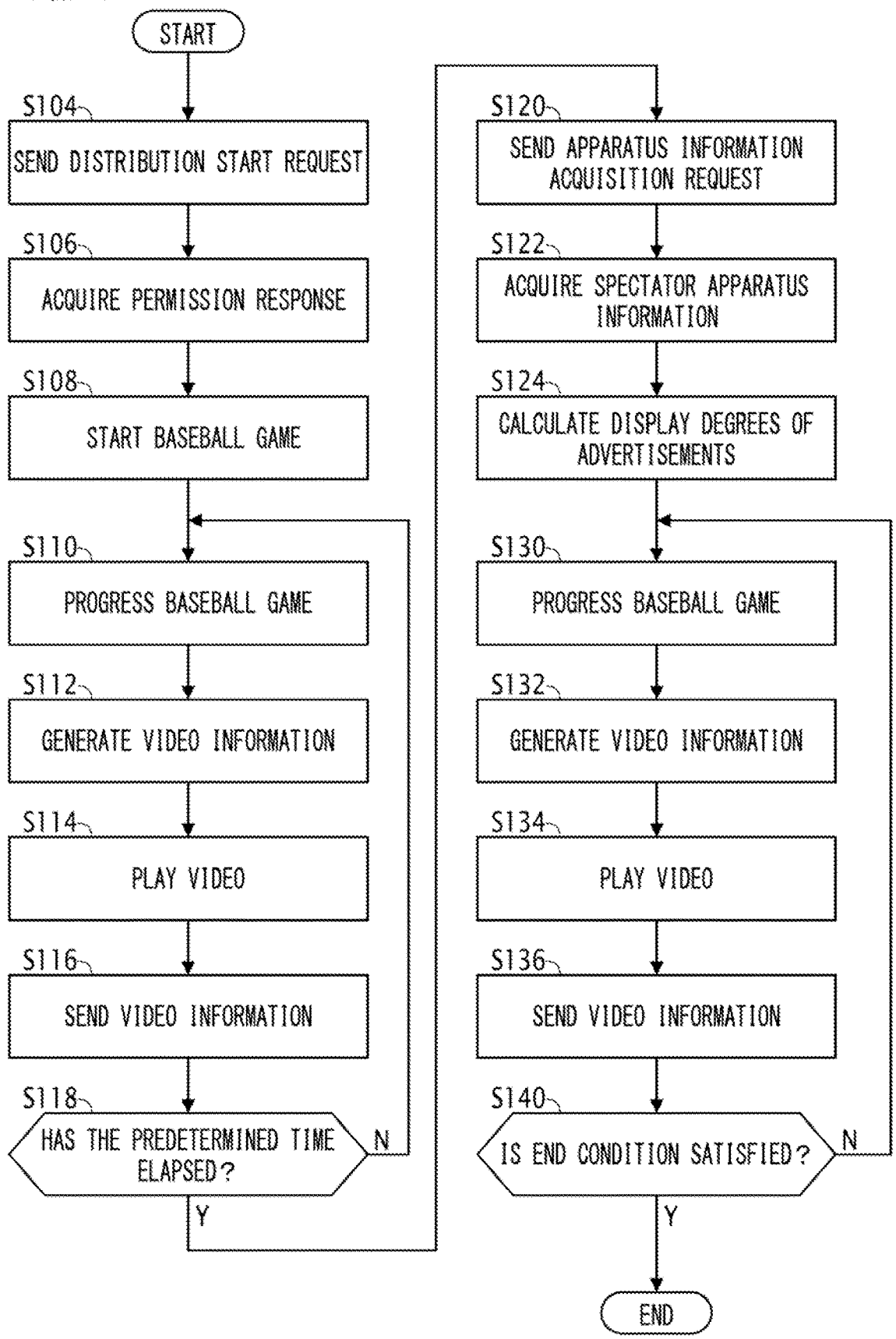
FIG. 12 is a flowchart showing an example of procedures for the game apparatus shown in FIG. 1.

FIG. 12 is a flowchart showing an example of procedures for the game apparatus 10 shown in FIG. 1. In FIG. 12, an example is shown of procedures for the game apparatus 10 after a series of steps S100 and S102 shown in FIG. 11 is executed (sending a table acquisition request REQtbl and acquiring the advertisement management table TBL). Step S104 shown in FIG. 12 is executed after the series of steps S100 and S102 shown in FIG. 11. Detailed description is omitted for procedures similar to those described in FIG. 11.

At step S104, the game processor 121 sends a distribution start request REQst to the distribution server 30. At step S106, the game processor 121 acquires a permission response ACKst that is sent from the distribution server and is a response to the distribution start request REQst. Thereafter, at step S108, the game processor 121 starts a computer baseball game.

In one example, at step S110, the game processor 121 progresses the computer baseball game, based on an input made to the input section 180 of the game apparatus 10. At step S110, the game processor 121 may generate progress state information indicative of the state of the computer game progressed based on an input made to the input section 180 of the game apparatus 10.

Next, at step S112, the game processor 121 generates video information MVinf. The video information MVinf is used to play a display-use video MVo indicative of the state of the computer game progressed at step S110. In one example, the game processor 121 generates video information MVinf that is used to play a display-use video MVo, based on the progress state information indicative of the state of the computer game progressed at step S112. In the procedures shown in FIG. 12, video advertisements AD based on the advertisement management table TBL are not incorporated into the video information MVinf generated at step S112.

Next, at step S114, the game processor 121 plays the display-use video MVo, based on the video information MVinf generated at step S110. As a result, the display-use video MVo is displayed on the display 21.

Next, at step S116, the video supplier 122 sends the video information MVinf generated at step S110 to the distribution server 30. The distribution-use video MVd based on the video information MVinf is supplied to the distribution server 30, and a distribution period starts.

Next, at step S118, the apparatus information acquirer 123 determines whether the predetermined time Ta has elapsed from the distribution start time t0. When the result of the determination at step S118 is negative, the apparatus information acquirer 123 returns the process to step S110. When the result of the determination at step S118 is positive, the apparatus information acquirer 123 moves the process to step S120.

At step S120, the apparatus information acquirer 123 sends an apparatus information acquisition request REQwt to the distribution server 30. At step S122, the apparatus information acquirer 123 acquires spectator apparatus information WTinf that is sent from the distribution server 30 and is in response to the apparatus information acquisition request REQwt.

Next, at step S124, the game processor 121 calculates a display degree of each of the advertisements, based on (i) the advertisement management table TBL and (ii) the spectator apparatus information WTinf acquired from the distribution server 30 at step S122. Then, the game processor 121 executes a series of steps S130 to S136.

The series of steps S130 to S136 is identical to that of steps S110 to S116, except that video advertisements AD are incorporated into the virtual space FD such that a display degree of each of the video advertisements AD in the virtual space FD is identical to that calculated at step S124.

In one example, step S130 is identical to step S110, and step S132 is identical to step S112. However, the video information MVinf generated at step S132 differs from that generated at step S1/2 in that the video advertisements AD based on the advertisement management table TBL are incorporated into the virtual space FD.

Step S134 is identical to step S114, and step S136 is identical to step S116. The video advertisements AD based on the advertisement management table TBL are incorporated into the virtual space FD indicated by the display-use video MVo played at step S134. Similarly, the video advertisements AD based on the advertisement management table TBL are incorporated into the virtual space FD indicated by the distribution-use video MVd, which is based on the video information MVinf sent to the distribution server 30 at step S136. After step S136, the video supplier 122 moves the process to step S140.

At step S140, the game processor 121 determines whether a predetermined end condition is satisfied, for example, the computer baseball game has ended. When the result of the determination at step S140 is negative, the game processor 121 returns the process to step S130. When the result of the determination at step S140 is positive, the game processor 121 ends the processes shown in FIG. 12.

After the end of the processes shown in FIG. 12, the game processor 121 may update the advertisement points of each of the video advertisements AD recorded in the advertisement management table TBL to a numerical value that takes into account points that have been used to show advertisements in the current computer baseball game. Then, the game processor 121 may send the updated advertisement management table TBL to the advertisement management server 50. Alternatively, when the result of the determination at step S140 is positive, the game processor 121 may send the updated advertisement management table TBL to the advertisement management server 50, and ends the processes shown in FIG. 12.

The procedures of the game apparatus 10 are not limited to the example shown in FIG. 12. In one example, steps S104 and S106 may be executed by a functional block other than the game processor 121, such as the video supplier 122. In one example, step S118 (determining whether the predetermined time Ta has elapsed from the distribution start time t0) may be executed by a functional block different from the apparatus information acquirer 123, such as the game processor 121. In addition, step S120 (sending an apparatus information acquisition request REQwt to the distribution server 30) may be omitted. In one example, step S116 (sending video information MVinf) may be executed before step S114 (playing a display-use video MVo), or it may be executed in parallel with step S114. Similarly, step S136 may be executed before step S134, or it may be executed in parallel with step S134.

In the foregoing embodiment, the game processor 121 progresses the computer baseball game, and generates, based on the progress result of the computer baseball game, video information MVinf that is used to play a display-use video MVo. The display-use video MVo indicates a state of the virtual space FD of the computer baseball game. The video supplier 122 supplies the video information MVinf to the distribution server 30 that distributes videos to the terminal apparatuses 70. Furthermore, the apparatus information acquirer 123 acquires spectator apparatus information WTinf from the distribution server 30. The spectator apparatus information WTinf relates to one or more terminal apparatuses 70, each of which is a part of the terminal apparatuses and receives a distribution-use video MVd based on the video information MVinf from the distribution server 30. The game processor 121 controls display of video advertisements AD in the virtual space FD, based on the spectator apparatus information WTinf acquired by the apparatus information acquirer 123.

Thus, in this embodiment, display of the video advertisements AD in the virtual space FD is controlled based on the spectator apparatus information WTinf. The spectator apparatus information WTinf relates to the terminal apparatuses 70 which receive distribution-use videos MVd from the distribution server 30. The terminal apparatuses 70 that receive the distribution-use videos MVd from the distribution server 30 correspond to terminal apparatuses 70 that play the distribution-use videos MVd. For this reason, controlling of display of video advertisements AD in the virtual space FD based on the spectator apparatus information WTinf is the same as controlling of display of the video advertisements AD in the virtual space FD by looking at the presence of spectators of the computer baseball game. Accordingly, in this embodiment, display of advertisements in the virtual space FD is controlled by looking at not only the users playing the computer baseball game, but also the spectators who watch the video thereof.

In one example, the game processor 121 may determine a duration during which a video advertisement AD is displayed in the virtual space FD, based on the apparatus information WTinf acquired by the apparatus information acquirer 123. Alternatively, the game processor 121 may determine the number of times a video advertisement AD is displayed in the virtual space FD, based on the spectator apparatus information WTinf acquired by the apparatus information acquirer 123.

Specifically, in one example, if the spectator apparatus information WTinf indicates the number of terminal apparatuses 70 receiving the distribution-use videos MVd from the distribution server 30 (i.e., the number of spectators), the game processor 121 can control, based on the number of spectators, a display duration or a display frequency of a video advertisement AD in the virtual space FD.

Thus, in this embodiment, a display degree of a video advertisement AD in the virtual space FD (e.g., a display duration and a display frequency) is determined by looking at the number of spectators of the computer baseball game. In other words, advertising values per unit period of time for displaying an advertisement are calculated based on the number of spectators, as a result of which, the advertisement is displayed for a time appropriate in view of advertisement points (advertising fees). In this embodiment, the number of spectators who watch the computer baseball game in real time can be known based on the spectator apparatus information WTinf. Accordingly, a display degree of a video advertisement AD in the virtual space FD is determined based on the number of spectators.

2. Modifications

The mode described above may be variously modified. Specific modified modes will be exemplified below. Two or more modes freely selected from among the following examples may be appropriately combined in a range so long as they do not conflict. In the modifications exemplified below, elements having operations and functions equivalent to those of the embodiment are also assigned symbols referred to in the above description, and detailed descriptions of the elements are omitted as appropriate.

Modification 1

In the foregoing embodiment, an example has been described in which the spectator apparatus information WTinf indicates the number of terminal apparatuses 70 that have received distribution-use videos MVd from the distribution server 30. However, the present disclosure is not limited to such an aspect. In one example, the apparatus information WTinf may be rating information on ratings of the distribution-use videos MVd that are given by the users of the terminal apparatuses 70, which receive the distribution-use videos MVd from the distribution server 30.

In one example, the rating information may indicate the number of users who gave a favorable rating to the distribution-use video MVd. Specifically, the rating information may indicate the number of users who have clicked the like button BTgd shown in FIG. 3, or it may indicate the number of times the like button BTgd has been clicked. Hereinafter, the number of users who have clicked the like button BTgd and the number of times the like button BTgd has been clicked are referred to as "number of high ratings" without making any particular distinction. In one example, a display duration of a video advertisement AD may be defined by "advertisement points/number of high ratings."

Alternatively, the spectator apparatus information WTinf may include both the number of spectator apparatuses and the number of high ratings. In this case, the display duration of the video advertisement AD may be defined by "advertisement points/(($\alpha\times$number of spectator apparatuses)+($\beta\times$number of high ratings))". Where $\alpha$ and $\beta$ indicate weight coefficients. The $\alpha$ is not particularly limited, but it may be "1." The $\beta$ is not particularly limited, but it may be a positive value less than 1.

In addition to a high rating, a poor rating may be used to calculate a display duration of a video advertisement AD. In this case, a button (hereinafter, "dislike button") for expressing user's negative feelings (e.g., dislike, not enjoyable, and disagree) toward a distribution-use video MVd may be displayed in a video distribution screen DS. This user is intended to be a user of the terminal apparatus 70-$m$. If high and poor ratings are used to calculate a display duration of a video advertisement AD, the display duration may be defined by "advertisement points/(number of high ratings–number of poor ratings)". The number of poor ratings may be the number of users who have clicked the dislike button, or it may be the number of times the dislike button has been clicked.

If a rating, such as a high or poor rating, is presented at multiple levels (e.g., five levels), the total score is obtained by adding up points that are given by users, each of the points corresponding to a high or a poor rating (the total score=the sum of points).

In Modification 1, display of advertisements in the virtual space FD is controlled by looking at the number of high ratings. A distribution-use video MVd with a favorable rating will be of high attention, which allows for effective advertisement, as compared to one with no favorable rating. In other words, in Modification 1, advertising values per unit period of time for displaying an advertisement are calculated accordingly by looking at the number of high ratings.

Modification 2

In the foregoing embodiments and in Modification 1, an example has been described in which the spectator apparatus information WTinf includes one or both of (i) the number of spectator apparatuses and (ii) the number of high ratings. However, the present disclosure is not limited to such an aspect. In one example, the spectator apparatus information WTinf may be comment information. The comment information relates to comments on the distribution-use videos MVd that are given by the users of the terminal apparatuses 70, which receive the distribution-use videos MVd from the distribution server 30.

The comment information may indicate the number of comments posted on the distribution-use video MVd (hereinafter, "number of comments"). In this case, a display duration of a video advertisement AD may be defined by "advertisement points/number of comments."

Alternatively, the spectator apparatus information WTinf may include (i) one or both of the number of spectator apparatuses and the number of high ratings, and (ii) the number of comments. In this case, a display duration of a video advertisement AD may be defined by "advertisement points/(($\alpha\times$number of spectator apparatuses)+($\beta\times$number of high ratings)+($\gamma\times$number of comments))". Where $\alpha$, $\beta$ and $\gamma$ indicate weight coefficients. The $\alpha$ is not particularly limited, but it may be "1" or "0." The $\beta$ is not particularly limited, but it may be 0 or more, and 1 or less. The $\gamma$ is not particularly limited, but it may be 0 or more, and 1 or less.

In Modification 2, display of advertisements in the virtual space FD is controlled by looking at the number of comments. The distribution-use video MVd with posted comments will be of high attention, which allows for effective advertisement as compared to one with fewer posted comments. In other words, in Modification 2, advertising values per unit period of time for displaying an advertisement are calculated accordingly by looking at the number of comments.

Modification 3

In the foregoing embodiment, and in Modifications 1 and 2, particular description has not been given of a method of calculating a display duration of a video advertisement AD by use of types of terminal apparatuses 70 playing a distribution-use video MVd. However, types of terminal apparatuses 70 are used to calculate a display duration of a video advertisement AD. In one example, a different weight value may be applied to a according to Modifications 1 and 2 in the following cases: (i) a case in which the terminal apparatuses 70 playing the distribution-use video MVd are mobile devices, such as smartphones; and (ii) a case in which they are stationary information devices, such as personal computers. Specifically, the (α×number of spectator apparatuses) may be defined by (α1×number of mobile devices+ α2×number of stationary information devices). The α1 and α2 are not particularly limited, but they may satisfy "0≤α1≤α2≤1." In Modification 3, the same effects as those in the foregoing embodiment, and in Modifications 1 and 2, are obtained.

Modification 4

In the foregoing embodiment and in Modifications 1 to 3, particular description has not been given of how long and how many times video advertisements AD are displayed on each of the displays 21 and 71 (e.g., a display duration and a display frequency). However, the display duration and the display frequency may be controlled based on the spectator apparatus information WTinf.

In one example, a video advertisement AD in the virtual space FD is displayed on the display 21 by playing the display-use video MVo. The game processor 121 may control one or both of a display duration and a display frequency of the video advertisement AD, based on the apparatus information WTinf acquired by the apparatus information acquirer 123. In this case, advertisement points may not be used during a period of time during which the video advertisement AD in the virtual space FD is not displayed on the display 21. Accordingly, advertising values per unit period of time for showing an advertisement on the display 21 or 71 are calculated accordingly.

Modification 5

In the foregoing embodiment and in Modifications 1 to 4, an example aspect has been given in which the game apparatus 10 acquires the spectator apparatus information WTinf at time t1 after the predetermined time Ta has elapsed from the distribution start time t0. However, the present disclosure is not limited to such an aspect. In one example, the game apparatus 10 may acquire the spectator apparatus information WTinf at the start of a predetermined inning in a computer baseball game (e.g., at the start of the third inning). In Modification 5, the same effects as those in the foregoing embodiment, and in Modifications 1 to 4, are obtained.

Modification 6

In the foregoing embodiment and in Modifications 1 to 5, an example aspect has been given in which a display degree of an advertisement that is calculated once is not updated until the end of the computer baseball game. However, the present disclosure is not limited to such an aspect. In one example, a display degree of an advertisement may be calculated repeatedly at intervals, as shown in FIG. 13.

Figure 13:
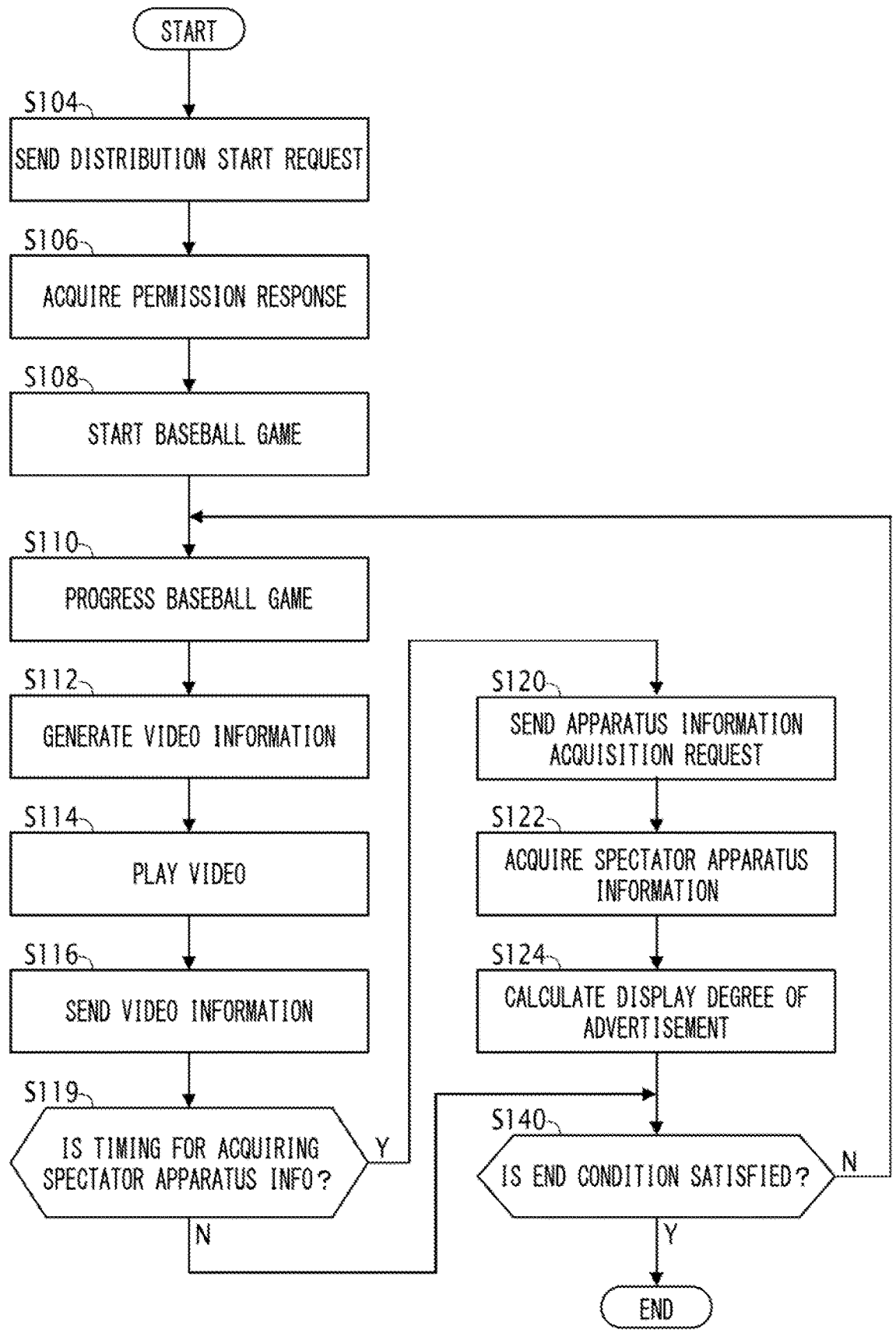
FIG. 13 is a flowchart showing an example of procedures for the game apparatus according to Modification 6.

FIG. 13 is a flowchart showing an example of procedures for the game apparatus 10 according to Modification 6. Detailed description will be omitted for procedures similar to those described in FIG. 12. In the procedures shown in FIG. 13, in one example, a series of steps S110 to step S116 serves as a series of steps S110 to S116, and a series of steps S130 to S136 shown in FIG. 12. Furthermore, in the procedures shown in FIG. 13, the determination procedure at step S119 is executed instead of that at step S18 shown in FIG. 12. The remaining procedures shown in FIG. 13 are identical to those shown in FIG. 12. In one example, step S110 is executed after step S108, or it is executed when the result of the determination at step S140 is negative.

When a display degree of each of the advertisements has not yet been calculated (e.g., when step S124 has not yet been executed), a series of steps S110 to S116 shown in FIG. 13 is identical to that shown in FIG. 12. In addition, when a display degree of each of the advertisements is calculated (e.g., when step S124 is executed even once), a series of steps S110 to S116 shown in FIG. 13 is identical to a series of steps S130 to S136 shown in FIG. In one example, after step S116, the video supplier 122 moves the process to step S119.

At step S119, the apparatus information acquirer 123 determines whether the current time is the timing for acquiring the spectator apparatus information WTinf. In one example, the apparatus information acquirer 123 determines whether the predetermined time Ta has elapsed from the distribution start time t0 or the previous timing for acquisition. When the result of the determination at step S119 is negative, the apparatus information acquirer 123 moves the process to step S140. When the result of the determination at step S119 is positive, the apparatus information acquirer 123 moves the process to step S120.

The series of steps S120 to S124 is identical to that shown in FIG. 12. In one example, at step S124 shown in FIG. 13, display degrees of advertisements that have not yet been displayed in the virtual space FD are calculated based on the remaining advertisement points, and the number of spectator apparatuses indicated by the spectator apparatus information WTinf acquired at step S122. After step S124, the game processor 121 moves the process to step S140.

At step S140, the game processor 121 determines whether a predetermined end condition is satisfied, for example, the baseball game has ended. When the result of the determination at step S140 is negative, the game processor 121 returns the process to step S110. When the result of the determination at step S140 is positive, the game processor 121 ends the processes shown in FIG. 12. Thus, in Modification 6, a display degree of each of the advertisements is calculated every time the predetermined time Ta elapses.

The procedures for the game apparatus 10 according to Modification 6 is not limited to the example shown in FIG. 13. In one example, an interval from the distribution start time t0 to the first timing of acquiring the spectator apparatus information WTinf may differ from an interval from the time t0 to the second timing or thereafter. In one example, a timing of acquiring the spectator apparatus information WTinf may be at the start of a predetermined inning, such as the third inning, the fifth inning, or the seventh inning. In one example, step S119 may be executed before S110. In this case, a series of steps S110 to S116 may be executed when the result of the determination at step S119 is negative, or it may be executed after step S124.

Thus, in Modification 6, the apparatus information acquirer 123 repeatedly acquires the spectator apparatus information WTinf at intervals. The game processor 121 calculates a display degree of each of advertisements every time the apparatus information acquirer 123 acquires the spectator apparatus information WTinf. Accordingly, in Modification 6, advertising values per unit period of time for displaying an advertisement are calculated accordingly based on the number of spectator apparatuses that changes during the computer baseball game.

Modification 7

In the foregoing embodiment, and in Modifications 1 to 6, a "computer baseball game" has been given as an example of a "computer game," but the present disclosure is not limited to such an aspect. A freely selected computer game may be employed as the "computer game" according to the present disclosure.

Modification 8

In the foregoing embodiment, and in Modifications 1 to 7, an example has been given in which the predetermined computer game is executed at the user's game apparatus 10, but the present disclosure is not limited to such an aspect. In one example, as shown in FIGS. 14A and 14B, the predetermined computer game may be executed at a game server 51.

Figure 14A:
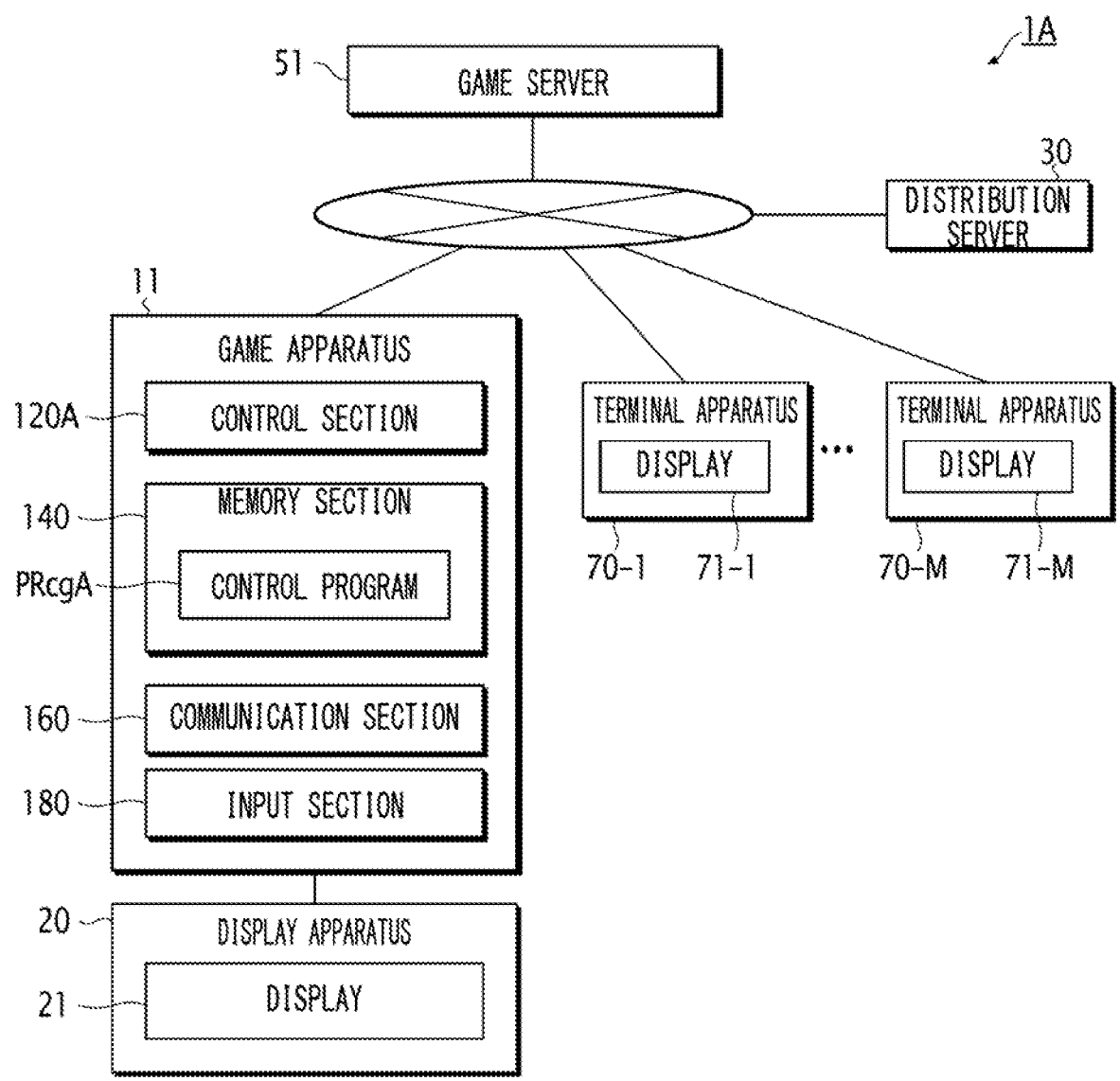
FIG. 14A is a diagram showing an overview of a game system according to Modification 8.
Figure 14B:
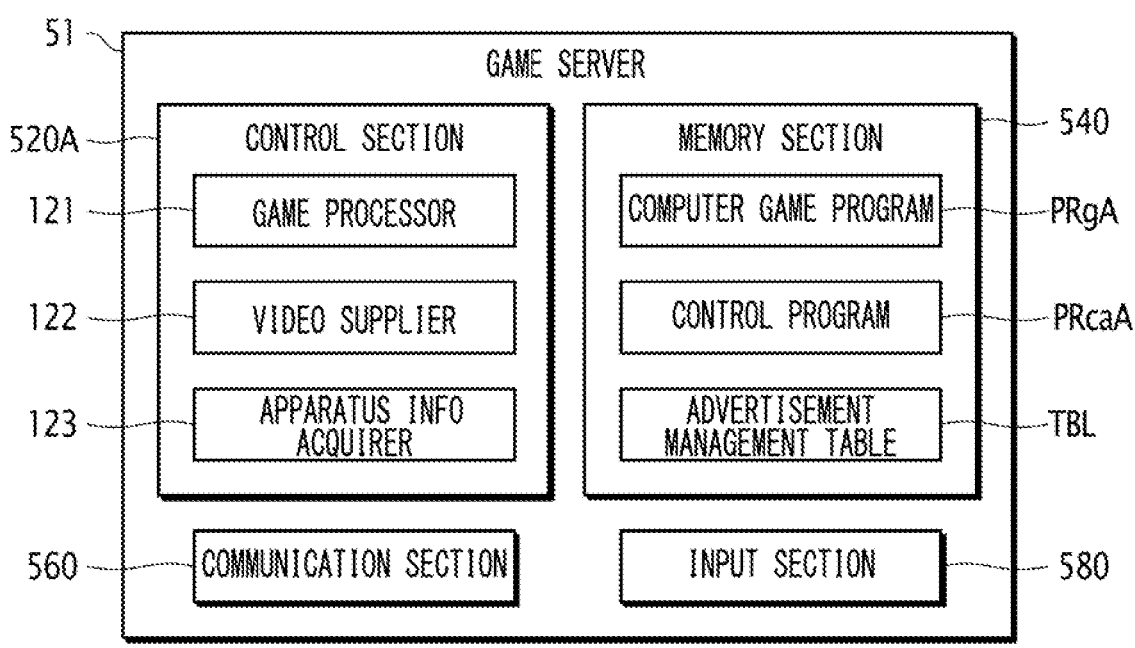
FIG. 14B is a functional block diagram of an example of a game server shown in FIG. 14A.

FIG. 14A is a diagram showing an overview of a game system 1A according to Modification 8. FIG. 14B is a functional block diagram of an example of the game server 51 shown in FIG. 14A. The game system 1A shown in FIG. 14A includes the game server 51 instead of the advertisement management server 50 shown in FIG. 1, and a game apparatus 11 instead of the game apparatus 10 shown in FIG. 1. The rest of the configuration of the game system 1A is identical to the game system 1 shown in FIG. 1. In one example, the game system 1A includes the game server 51 that executes the predetermined computer game, the game apparatus 11, the display apparatus corresponding to the game apparatus 11, the distribution server 30, and a plurality of M terminal apparatuses 70 (70-1 to 70-M). The M is a natural number of 1 or more. The game apparatus 11, the distribution server 30, the game server 51, and each terminal apparatus 70 are connected communicably to one another via a network NW.

The game server 51 (another example of a "game apparatus") executes the predetermined computer game. Furthermore, the game server 51 serves as the advertisement management server 50 shown in FIG. 1. In one example, as shown in FIG. 14B, the game server 51 includes a control section 520A that controls each part of the game server 51, the memory section 540 that stores various information, the communication section 560 that communicates with external apparatuses including the game apparatus 11, the distribution server 30, and the terminal apparatus 70, and an input section 580 that receives administrator's inputs made to the game server 51.

In one example, the control section 520A includes the game processor 121, the video supplier 122, and the apparatus information acquirer 123, all of which are described in FIG. 4 and other drawings. In one example, the memory section 540 includes a computer game program PRgA (an example of a "computer program") for executing the predetermined computer game, a control program PRcaA for controlling each part of the game server 51, and the advertisement management table TBL.

As shown in FIG. 14A, the game apparatus 11 includes a control section 120A, the memory section 140 that stores a control program PRcgA and other programs of the game apparatus 11, and the communication section 160 that communicates with external apparatuses including the distribution server 30 and the game server 51, and the input section 180 that receives user's inputs made to the game apparatus 11. On the bases of video information MVinf generated by the game server 51, the control section 120A shows a display-use video MVo relating to the predetermined computer game on the display 21, which is included in the display apparatus 20 corresponding to the game apparatus 11.

In one example, the hardware configuration of the game server 51 is identical to that of the advertisement management server 50 including an input apparatus that functions as the input section 580, as shown in FIG. 9. In one example, as described in FIG. 9, the memory 54 functions as the memory section 540. Accordingly, in Modification 8, the memory 54, which functions as the memory section 540 storing the computer game program PRgA, corresponds to a non-transitory recording medium on which the computer game program PRgA is recorded. In one example, the memory 54 is a computer-readable recording medium. In Modification 8, the "storage medium" on which the computer game program PRgA is recorded is a storage device provided in an external apparatus external to the game server 51. In one example, the "storage medium" may be a storage device that is configured to record therein the computer game program PRgA. The storage device may be included in a server apparatus external to the game server 51 and distributes the computer game program PRgA.

In Modification 8, the same effects as those in the foregoing embodiment, and in Modifications 1 and 7 are obtained.

Modification 9

In the foregoing embodiment and in Modifications 1 to 7, an example has been given of a game apparatus 10 including the apparatus information acquirer 123, but the present disclosure is not limited to such an aspect. In one example, the advertisement management server 50 may include the apparatus information acquirer 123. In this case, the advertisement management server 50 may supply, to the game apparatus 10, spectator apparatus information WTinf acquired from the distribution server 30. Alternatively, based on the advertisement management table TBL and the spectator apparatus information WTinf, the advertisement management server 50 may calculate a display degree of each of the video advertisements AD in the virtual space FD (e.g., a display duration and a display frequency), and it may supply information indicative of the calculated degrees thereof to the game apparatus 10. Furthermore, in the game system 1A shown in FIG. 14A, the game processor 121 and the video supplier 122 may be included in the game apparatus 11. In Modification 9, the same effects as those in the foregoing embodiment, and in Modifications 1 and 7 are obtained.

3. Appendices

From the foregoing description, the present disclosure can be understood as follows:

Appendix 1

A recording medium according to an aspect of the present disclosure is a non-transitory computer-readable recording medium having instructions stored therein that cause at least one processor (e.g., a processor 12) of a game apparatus (e.g., a game apparatus 10) to: communicate with a distribution system (e.g., a distribution server 30) configured to distribute videos to a plurality of terminal apparatuses (e.g., terminal apparatuses 70); progress a computer game; generate, based on a progress of the computer game, video information (e.g., video information MVinf) that is used to play a video of the computer game (e.g., a display-use video MVo) indicating a state of a virtual space of the computer game; supply the video information to the distribution system; acquire spectator apparatus information (e.g., spectator apparatus information WTinf) from the distribution system, the spectator apparatus information relating to at least one spectator apparatus that is a part of the plurality of terminal apparatus, and receives a video (e.g., a distribution-use video MVd) based on the video information from the distribution system; and control display of an advertisement in the virtual space, based on the spectator apparatus information.

According to this aspect, display of an advertisement in the virtual space is controlled based on the spectator apparatus information. The spectator apparatus corresponds to a terminal apparatus that plays a video based on video information received from the game apparatus via the distribution system. For this reason, controlling of display of an advertisement in the virtual space based on the spectator apparatus information is the same as controlling of display of the advertisement in the virtual space by looking at the presence of a spectator of the computer game. Accordingly, according to this aspect, display of the advertisement in the virtual space is controlled by looking at not only a user playing the computer game, but also a spectator watching the video thereof.

In this aspect, the "state of a virtual space" may relate to a game element in the virtual space, or it may relate to sound in the virtual space, or it may be some or all of the states.

The "game element in the virtual space" may be disposed at any position in the virtual space. The "game element" may be controlled by a program of the game apparatus (a processor executed by the program). Alternatively, the "game element" may be a character relating to the computer game, an object of the computer game, an environmental component of the virtual space, or it may be some or all of these. The "state relating to a game element" may be a position of a game element in the virtual space, or it may be the shape, pattern, or color of the game element, or it may be a direction or a speed of movement of the game element in the virtual space, or it may be some or all of these.

The "sound in the virtual space" may be outputted or heard at any position in the virtual space, or it may be associated with a game element in the virtual space, or it may be both of these. The "sound" may also be voice (audio).

In this aspect, the "video information" may indicate a game image (a still image indicative of the state of the virtual space) that is updated every unit period of time in real time, or it may indicate a set of game images that correspond one-to-one to unit periods of time (information indicative of a set of game images accumulated over multiple unit periods of time). Alternatively, the "video information" may be obtained by adding information on sound in the virtual space to information described above.

In this aspect, the "spectator apparatus information" may be information on a spectator apparatus that plays the video of the computer game, or it may be information based on a user input made to the spectator apparatus, or it may be information using both of these.

The "information on a spectator apparatus" may indicate the number of spectator apparatuses, or the type thereof, or both of these.

The "information based on a user input made to the spectator apparatus" may be information on a rating of the video of the computer game that is given by a user of the spectator apparatus, or it may be information on comments posted on the video of the computer game by the user of the spectator apparatus, or it may be information using both of these.

The "information on a rating of the video of the computer game" may be the number of users who gave a favorable rating to the video of the computer game.

The "information on comments" may be the number of comments posted on the video of the computer game.

In this aspect, the "advertisement" may be a still image or moving images relating to a target advertisement, such as a product or a service, which is displayed on a game element in the virtual space, or it may be an audio relating to the advertisement, which is output from the game element in the virtual space, or it may be some or all of these.

In this aspect, the "display of the advertisement in the virtual space" may mean that there is an advertisement (one or both of image and sound relating to the target advertisement) in the virtual space. Alternatively, the "display of the advertisement in the virtual space" may mean the advertisement in the virtual space is displayed by playing the video of the computer game.

In this aspect, "controlling the display of the advertisement" may mean that a duration during which an advertisement is displayed in the virtual space is controlled, or it may mean that the number of times the advertisement is displayed in the virtual space is controlled, or it may be both of these.

Appendix 2

In the recording medium according to Appendix 1, the instructions cause the at least one processor to determine, based on the spectator apparatus information, a duration during which the advertisement is displayed in the virtual space.

According to this aspect, the duration during which the advertisement is displayed in the virtual space (a display duration) is determined based on the spectator apparatus information. Accordingly, according to this aspect, the advertising values per unit period of time at for displaying the advertisement is calculated based on the spectator apparatus information. For this reason, in this aspect, as to advertising fees for displaying the advertisement in the virtual space, occurrence of excessive display or insufficient display of the advertisement is controlled.

Appendix 3

In the recording medium according to Appendix 1, the instructions cause the at least one processor to determine, based on the spectator apparatus information, a number of times the advertisement is displayed in the virtual space.

According to this aspect, the number of times the advertisement is displayed in the virtual space (a display frequency) is determined based on the spectator apparatus information. Accordingly, in this aspect, the advertising values for displaying the advertisement one time is calculated based on the spectator apparatus information. For this reason, in this aspect, as to advertising fees for displaying the advertisement in the virtual space, occurrence of excessive display or insufficient display of the advertisement is controlled.

Appendix 4

In the recording medium according to any one of Appendices 1 to 3, the spectator apparatus information indicates a number of the at least one spectator apparatus.

According to this aspect, the display duration or the display frequency of the advertisement in the virtual space is determined based on the number of spectator apparatuses. In one example, the number of spectator apparatuses corresponds to the number of spectators who watch the video of the computer game. Accordingly, in this aspect, a display degree of the advertisement in the virtual space (e.g., a display duration and a display frequency) is determined based on the number of spectators watching the computer game in real time. For this reason, according to this aspect, the advertising values per unit period of time or for displaying the advertisement one time is calculated based on the number of spectators.

Appendix 5

In recording medium according to any one of Appendices 1 to 3, the spectator apparatus information relates to a rating of the video of the computer game that is given by a user of the at least one spectator apparatus.

According to this aspect, the display duration or the display frequency of displaying the advertisement in the virtual space is determined based on a rating of the video of the computer game that is given by a user of the spectator apparatus (i.e., a spectator). In one example, a highly rated video of the computer game will have a high level of attention, which allows for effective advertisement, as compared to a poorly rated one. In other words, in this aspect, the advertising values per unit period of time or for displaying the advertisement one time is calculated accordingly by looking at the rating of the video of the computer game.

In this aspect, the "spectator apparatus information" may indicate the number of users who gave favorable ratings of the video of the computer game, or it may indicate the number of favorable ratings thereof.

Appendix 6

In the recording medium according to any one of Appendices 1 to 3, the spectator apparatus information relates to a comment on the computer game that is given by a user of the at least one spectator apparatus.

According to this aspect, the display duration or the display frequency of displaying the advertisement in the virtual space is determined based on a comment on the video of the computer game that is given by a user of the spectator apparatus (i.e., a spectator) (hereinafter, a posted comment).

In one example, a video of the computer game with numerous posted comments will have a high level of attention, which allows for effective advertisement, as compared to one with fewer posted comments. In other words, in this aspect, the advertising values per unit period of time or for displaying the advertisement one time is calculated by looking at the number of comments on the video of the computer game.

Appendix 7

In the recording medium according to any one of Appendices 1 to 6, the instructions cause the at least one processor to control, based on the spectator apparatus information, at least one of display duration or display frequency of the advertisement in the virtual space that is displayed by playing the video of the computer game.

According to this aspect, one or both of the display duration and the display frequency of the advertisement that is in the virtual space and is displayed by playing the video of the computer game is determined based on the spectator apparatus information. According to this aspect, for example, the advertising values per unit period of time or for displaying the advertisement one time on the display is calculated accordingly based on the spectator apparatus information.

Appendix 8

A game apparatus according to an aspect of the present disclosure includes: at least one memory storing instructions; and at least one processor that implements the instructions to: communicate with a distribution system configured to distribute videos to a plurality of terminal apparatuses; progress a computer game; generate, based on a progress of the computer game, video information that is used to play a video of the computer game indicating a state of a virtual space of the computer game; acquire spectator apparatus information from the distribution system, when the distribution system distributes a video based on the video information to at least one spectator apparatus that is a part of the plurality of the terminal apparatuses, the spectator apparatus information relating to the at least one spectator apparatus; and control display of an advertisement in the virtual space, based on the spectator apparatus information.

According to this aspect, the same effects as those in Appendix 1 are obtained.

Appendix 9

A computer-implemented control method according to an aspect of the present disclosure includes: communicating with a distribution system configured to distribute videos to a plurality of terminal apparatuses; progressing a computer game; generating, based on a progress of the computer game, video information that is used to play a video of the computer game indicating a state of a virtual space of the computer game; acquiring spectator apparatus information from the distribution system, when the distribution system distributes a video based on the video information to at least one spectator apparatus that is a part of the plurality of the terminal apparatuses, the spectator apparatus information relating to the at least one spectator apparatus; and controlling display of an advertisement in the virtual space, based on the spectator apparatus information.

According to this aspect, the same effects as those in Appendix 1 are obtained.

Appendix 10

A game system according to an aspect of the present disclosure includes: a distribution system configured to distribute videos to a plurality of terminal apparatuses; and a game apparatus configured to communicate with the distribution system, in which the game apparatus includes: at least one memory storing instructions; and at least one processor that implements the instructions to: progress a computer game; generate, based on a progress of the computer game, video information that is used to play a video of the computer game indicating a state of a virtual space of the computer game; acquire spectator apparatus information from the distribution system, when the distribution system distributes a video based on the video information to at least one spectator apparatus that is a part of the plurality of the terminal apparatuses, the spectator apparatus information relating to the at least one spectator apparatus; and control display of an advertisement in the virtual space, based on the spectator apparatus information.

According to this aspect, the same effects as those in Appendix 1 is obtained.

DESCRIPTION OF REFERENCE SIGNS 1, 1A . . . game system, 10 . . . game apparatus, 11 . . . game apparatus, 12 . . . processor, 14 . . . memory 16 . . . communication apparatus, 18 . . . input apparatus, 20 . . . display apparatus, 21 . . . display, 30 . . . distribution server, 32 . . . processor, 34 . . . memory, 36 . . . communication apparatus, 50 . . . advertisement management server, 51 . . . game server, 52 . . . processor, 54 . . . memory, 56 . . . communication apparatus, 70 . . . terminal apparatus, 71 . . . display, 120 . . . control section, 121 . . . game processor, 122 . . . video supplier, 123 . . . apparatus information acquirer, 140 . . . memory section, 160 . . . communication section, 180 . . . input section, 320 . . . control section, 321 . . . video acquirer, 322 . . . video distributor, 324 . . . apparatus information supplier, 340 . . . memory section, 360 . . . communication section, 520 . . . control section, 521 . . . supplier, 540 . . . memory section, and, 560 . . . communication section.

What is claimed is:

1. A non-transitory computer-readable recording medium having instructions stored therein that cause at least one processor of a game apparatus to:
communicate with a distribution system configured to distribute videos to a plurality of terminal apparatuses;
progress a computer game;
generate, based on the progress of the computer game, video information that is used to play a video of the computer game indicating a state of a virtual space of the computer game;
supply the video information to the distribution system;
acquire spectator apparatus information from the distribution system, the spectator apparatus information relating to at least one spectator apparatus that is included in the plurality of terminal apparatuses, and that receives a video based on the video information from the distribution system,
determine a display degree for the advertisement to be displayed based on the spectator apparatus information; and
control a display of an advertisement in the virtual space, based on the determined display degree.

2. The recording medium according to claim 1, wherein the determined display degree includes a duration during which the advertisement is displayed in the virtual space.

3. The recording medium according to claim 1, wherein the determined display degree includes a number of times the advertisement is displayed in the virtual space.

4. The recording medium according to claim 1, wherein the spectator apparatus information indicates a number of the at least one spectator apparatus.

5. The recording medium according to claim 1, wherein the spectator apparatus information relates to a rating of the video of the computer game that is given by a user of the at least one spectator apparatus.

6. The recording medium according to claim 1, wherein the spectator apparatus information relates to a comment on the computer game that is given by a user of the at least one spectator apparatus.

7. The recording medium according to claim 1, wherein the determined display degree includes at least one of a display duration or a display frequency of the advertisement that is in the virtual space and is displayed by playing the video of the computer game.

8. A computer-implemented control method comprising:
communicating with a distribution system configured to distribute videos to a plurality of terminal apparatuses;
progressing a computer game;
generating, based on the progress of the computer game, video information that is used to play a video of the computer game indicating a state of a virtual space of the computer game;
acquiring spectator apparatus information from the distribution system, when the distribution system distributes a video based on the video information to at least one spectator apparatus that is included in the plurality of the terminal apparatuses, the spectator apparatus information relating to the at least one spectator apparatus,
determining a display degree for the advertisement to be displayed based on the spectator apparatus information; and
controlling a display of an advertisement in the virtual space, based on the determined display degree.

9. A game system comprising:
a distribution system configured to distribute videos to a plurality of terminal apparatuses; and
a game apparatus configured to communicate with the distribution system,
wherein the game apparatus includes:
at least one memory storing instructions; and
at least one processor that implements the instructions to:
progress a computer game;
generate, based on the progress of the computer game, video information that is used to play a video of the computer game indicating a state of a virtual space of the computer game;
acquire spectator apparatus information from the distribution system, when the distribution system distributes a video based on the video information to at least one spectator apparatus that is included in the plurality of the terminal apparatuses, the spectator apparatus information relating to the at least one spectator apparatus,
determine a display degree for the advertisement to be displayed based on the spectator apparatus information; and
control a display of an advertisement in the virtual space, based on the determined display degree.

10. The recording medium according to claim 1, wherein the instructions cause the at least one processor to:
assign advertisement points to the advertisement to be displayed in the virtual space; and
determine the display degree of the advertisement based on the spectator apparatus information and the advertisement points.

11. The recording medium according to claim 1, wherein the instructions cause the at least one processor to:
assign advertisement points to each of a plurality of advertisements to be displayed,
determine a display degree for each of the plurality of advertisements to be displayed based on the respective advertisement points and the spectator apparatus information; and
control a display of the plurality of advertisements to be displayed the virtual space based on the determined display degree of each of the plurality of advertisements.

12. The recording medium according to claim 11, wherein the plurality of advertisements are displayed sequentially based on the determined display degree.

13. The recording medium of claim 1, wherein the instructions cause the at least one processor to periodically update the display degree of the advertisement based on the display of the advertisement in the virtual space.

14. The recording medium of claim 11, wherein the instructions cause the at least one processor to periodically update the display degree of the plurality of advertisements based on the display of the plurality of advertisements in the virtual space.

15. The recording medium of claim 1,
wherein the advertisement to be displayed in the virtual space comprises at least one of an audio advertisement or a video advertisement.

* * * * *